United States Patent
Culli et al.

(10) Patent No.: US 7,573,997 B2
(45) Date of Patent: Aug. 11, 2009

(54) LOCAL ROUTING SYSTEM AND METHOD

(75) Inventors: Laura Culli, Austin, TX (US); Bruce A. Nance, San Antonio, TX (US); John E. Simino, San Antonio, TX (US); Harold C. Fleischer, III, San Antonio, TX (US); Michael Hanrahan, St. Louis, MO (US); M. Lourdes Coronado, Austin, TX (US)

(73) Assignee: AT&T Labs, Inc., Austin, TX (US)

( * ) Notice: Subject to any disclaimer, the term of this patent is extended or adjusted under 35 U.S.C. 154(b) by 6 days.

(21) Appl. No.: 11/755,899

(22) Filed: May 31, 2007

(65) Prior Publication Data

US 2007/0230474 A1    Oct. 4, 2007

Related U.S. Application Data

(63) Continuation of application No. 11/391,247, filed on Mar. 29, 2006, now Pat. No. 7,242,753, which is a continuation of application No. 10/900,182, filed on Jul. 28, 2004, now Pat. No. 7,065,193, which is a continuation of application No. 10/462,786, filed on Jun. 17, 2003, now Pat. No. 6,795,539, which is a continuation of application No. 10/191,419, filed on Jul. 10, 2002, now Pat. No. 6,618,472, which is a continuation of application No. 09/747,940, filed on Dec. 27, 2000, now Pat. No. 6,442,267, which is a continuation of application No. 09/112,384, filed on Jul. 9, 1998, now Pat. No. 6,205,214.

(60) Provisional application No. 60/052,016, filed on Jul. 9, 1997, provisional application No. 60/068,952, filed on Dec. 30, 1997.

(51) Int. Cl.
*H04M 7/00* (2006.01)

(52) U.S. Cl. .......................... 379/221.02; 379/220.01; 379/221.09; 379/221.14

(58) Field of Classification Search ................. 379/111, 379/114.01, 114.03, 114.05, 114.28, 115.01, 379/118, 120, 121.01, 125, 126, 127.01, 379/127.03, 127.06, 220.01, 221.02, 221.08, 379/221.09, 221.11, 221.14, 229, 230; 370/358, 370/410, 522
See application file for complete search history.

(56) References Cited

U.S. PATENT DOCUMENTS

| | | |
|---|---|---|
| 5,153,907 A | 10/1992 | Pugh et al. |
| 5,392,344 A | 2/1995 | Ash et al. |
| 5,550,912 A | 8/1996 | Akinpelu et al. |
| 5,574,783 A | 11/1996 | Dunn |
| 5,606,600 A | 2/1997 | Elliot et al. |
| 5,689,555 A | 11/1997 | Sonnenberg |

(Continued)

*Primary Examiner*—Binh K Tieu
(74) *Attorney, Agent, or Firm*—Greenblum & Bernstein P.L.C.

(57) ABSTRACT

A communication network element determines a service provider's routing preference for routing communications and routes these communications from an originating connection address to a destination connection address over a network. The communication network element includes a receiver configured to receive a signal, which comprises the originating connection address and the destination connection address. The communication network element also includes a processor that determines the service provider associated with at least one of the originating connection address and the destination connection address of the received signal. The processor also determines the routing preference associated with the service provider using routing data.

20 Claims, 11 Drawing Sheets

U.S. PATENT DOCUMENTS

| | | | |
|---|---|---|---|
| 5,696,816 A * | 12/1997 | Sonnenberg | 379/221.13 |
| 5,703,938 A | 12/1997 | Lucas et al. | |
| 5,712,908 A | 1/1998 | Brinkman et al. | |
| 5,774,530 A | 6/1998 | Montgomery et al. | |
| 5,809,121 A | 9/1998 | Elliott et al. | |
| 5,854,835 A | 12/1998 | Montgomery et al. | |
| 5,903,639 A * | 5/1999 | Lipchock et al. | 379/221.08 |
| 5,970,130 A | 10/1999 | Katko | |
| 6,035,028 A | 3/2000 | Ward et al. | |
| 6,035,029 A | 3/2000 | Little et al. | |
| 6,038,227 A | 3/2000 | Farris et al. | |
| 6,055,232 A | 4/2000 | Ward et al. | |
| 6,130,941 A | 10/2000 | Nimmagadda et al. | |
| 6,205,214 B1 | 3/2001 | Culli et al. | |
| 6,282,267 B1 | 8/2001 | Nolting | |
| 6,320,953 B1 | 11/2001 | Ward et al. | |
| 6,330,250 B1 | 12/2001 | Curry et al. | |
| 6,330,324 B1 | 12/2001 | Sabinson et al. | |
| 6,411,699 B1 | 6/2002 | Fleischer, III et al. | |
| 6,442,267 B2 | 8/2002 | Culli et al. | |
| 6,542,598 B2 | 4/2003 | Fleischer, III et al. | |
| 6,795,539 B2 | 9/2004 | Culli et al. | |
| 7,242,753 B2 | 7/2007 | Culli et al. | |
| 2001/0048738 A1 | 12/2001 | Baniak et al. | |

* cited by examiner

LOCAL ROUTING SYSTEM AND METHOD

CROSS REFERENCES TO RELATED APPLICATIONS

The present application is a continuation of pending U.S. patent application Ser. No. 11/391,247, filed on Mar. 29, 2006, which is a continuation of U.S. patent application Ser. No. 10/900,182, filed on Jul. 28, 2004, and issued as U.S. Pat. No. 7,065,193 on Jun. 20, 2006, which is a continuation of U.S. patent application Ser. No. 10/462,786, filed on Jun. 17, 2003, and issued as U.S. Pat. No. 6,795,539 on Sep. 21, 2004, which is a continuation of U.S. patent application Ser. No. 10/191,419, filed on Jul. 10, 2002, and issued as U.S. Pat. No. 6,618,472 on Sep. 9, 2003, which is a continuation of U.S. patent application Ser. No. 09/747,940, filed on Dec. 27, 2000, and issued as U.S. Pat. No. 6,442,267 on Aug. 27, 2002, which is a continuation of U.S. patent application Ser. No. 09/112,384, filed on Jul. 9, 1998, and issued as U.S. Pat. No. 6,205,214 on Mar. 20, 2001, which claims the benefit of U.S. Provisional Patent Application Ser. No. 60/052,016, filed on Jul. 9, 1997, and U.S. Provisional Patent Application No. 60/068,952, filed on Dec. 30, 1997, the disclosures of which are expressly incorporated herein by reference in their entireties.

BACKGROUND OF THE INVENTION

1. Field of the Invention

The present invention is related to an apparatus and method for call routing within a telecommunications environment. More particularly, the present invention relates to an apparatus and method for a local routing system enabling a local exchange carrier to route network traffic according to a local service provider's preferences.

2. Background and Material Information

Congress enacted the Telecommunications Act of 1996 as part of an effort to foster competition in the local telephone industry. Interpretations and enforcement of key portions of the Act were placed in the jurisdiction of the Federal Communications Commission. The FCC quickly set forth regulations which required incumbent local exchange carriers (LECs) to allow competitive local exchange carriers (CLECs, also often referred to as local service providers or LSPs) to utilize the LEC's networks to establish a market presence in a region while the CLEC built its own physical network. The FCC rulings required LECs to make their network components available using a resale approach in which the CLEC purchases existing service bundles from the LEC and resells those bundles to the CLEC's customers or an unbundled approach, in which the CLEC purchases individual service components from the LEC, recombines those elements in its own (possibly distinct) service bundles, sells those rebundled services to its customers, and pays the LEC for the usage of the unbundled components.

A final FCC ruling required LECs to provide the same routing flexibility for selected types of calls (local calls, operator calls, and directory assistance calls) to CLECs as it utilizes for its own service offerings for both resale and unbundled customers.

In the existing telephone network, the routing of calls and the billing for toll charges and usage charges is largely determined by special translations referred to as line class codes (LCCs). LCCs are used to associate a variety of other translations into a class of service which provides a particular local/toll calling scope and specifies where special call types such as operator or directory assistance are routed. The LCCs can also block selected types of calls (900, 1+toll, international, etc.).

The large number of special calling plans, call restrictions, and permutations of these combinations requires a large number (several hundred, in most cases) of LCCs to be translated in each LEC switch. In order to meet FCC requirements to provide CLECs the same dialing plans offered by the LEC with alternate routing and/or usage sensitive billing, existing LCC translations could be duplicated and altered as required. However, such an approach would be labor intensive, error prone, and cost prohibitive. In some cases, attempting to duplicate existing LCCs would exhaust the serving switch's available supply of LCC translations.

To avoid the problems associated with using LCC translations to meet FCC requirements, a system is need which can re-use existing LCC translations to enforce available dialing plans but override the routing of specific call types as requested by a CLEC, and create appropriate usage bill records for calls involving subscribers served by unbundled network elements. Furthermore, it is desirable to perform this additional call processing in a centralized system to allow local service providers to change their preferences without requiring manual changes in hundreds of decentralized switches.

SUMMARY OF THE INVENTION

In view of the foregoing, the present invention, through one or more of its various aspects, embodiments and/or specific features or sub-components, is thus intended to bring out one or more of the advantages as specifically noted below.

A local routing system is provided for selectively routing traffic in a telecommunications network according to a local service provider's preferences. The local service provider provides service for telephone lines acquired from a local exchange carrier. The telecommunications network supports an originator subscribing to the local service provider. The originator initiates a trigger when originating a call to a destination by dialing a number.

The local routing system includes a classifier, a determiner, and a router. The classifier analyzes the dialed number and categorizes the call into one of several predetermined classes of traffic. The predetermined classes of traffic can be operator assistance traffic, directory assistance traffic, and local traffic. The determiner determines whether the local service provider has a routing preference for the class of traffic into which the classifier has placed the call. The router routes the traffic to the destination according to the local service provider's routing preference if a routing preference exists for the class of traffic into which the classifier placed the call.

According to a preferred embodiment, the local routing system also includes a filter which analyzes the dialed number and determines whether the call is local. The filter determines whether the call is local by first comparing an originating local access and transport area (LATA) with a destination LATA, and if the LATAs are identical, the filter checks whether the destination NPANXX is within the local calling scope of the originator.

According to a preferred embodiment, the determiner determines the routing preference for each switch serving the originator. Furthermore, the local service provider indicates a routing preference for each switch within a local service provider network, and for each class of traffic. In addition, the local service provider may indicate a routing preference for each line within each switch within the local service provider network. When a routing preference for a line exists, the line routing preference supersedes the routing preference for the switch.

According to a preferred embodiment, the local routing system also includes a billing generator that generates a billing record for each unbundled call that is routed according to the local service provider's preferences. The billing generator may generate a terminating access billing record for each unbundled call completed to a subscriber of the local service provider. The billing generator may also generate an originating access billing record for each unbundled call originated by the subscriber of the local service provider.

According to a preferred embodiment, the local routing system also includes a switch filter that filters all calls to predetermined numbers. Consequently, the filtered calls to the predetermined numbers are blocked from the classifier, determiner and router. Therefore, the filtered calls are routed according to the local exchange carrier's instructions.

A billing system is provided for generating billing in a telecommunications network according to a local service provider's usage. The local service provider provides service for telephone lines acquired from a local exchange carrier. The telecommunications network supports a destination subscribing to the local service provider. The billing system includes a terminating trigger initiated by the destination upon receiving a call, and a billing generator. The billing generator generates a terminating access billing record for each unbundled call completed to the destination subscribing to the local service provider. In addition, the billing system may include an originating trigger initiated by an originator subscribing to the local service provider upon placing an unbundled call. In response to the originating trigger, the billing generator generates an originating access billing record for each unbundled call placed by the originator.

A local routing method is provided for selectively routing traffic in a telecommunications network according to a local service provider's preferences. The local service provider provides service for telephone lines acquired from a local exchange carrier. The telecommunications network supports an originator subscribing to the local service provider. The originator initiates a trigger when originating a call to a destination by dialing a number.

The method includes analyzing, determining, and routing. The analyzing includes analyzing the dialed number to place the call into a predetermined classes of traffic. The predetermined classes of traffic may include operator assistance traffic, directory assistance traffic, and local traffic. The determining includes determining whether the local service provider has a routing preference for the class of traffic into which the classifier has placed the call. The routing includes routing the traffic to the destination according to the local service provider's routing preference, if a routing preference exists for the class of traffic into which the classifier placed the call.

According to a preferred embodiment, the local routing method also includes analyzing the dialed number to determine whether the call is local. If the call is not local the traffic is routed to a non-local switch. It is determined whether the call is local by comparing an originating local access and transport area (LATA) with a destination LATA. If the LATAs are identical, the method also includes checking whether a destination NPANXX is within a local calling scope of the originator.

According to a preferred embodiment, the local routing method also includes determining the routing preference for the switch serving the originator. Accordingly, the local service provider indicates a specific routing preference for each switch within a local service provider network, and a routing preference for each class of traffic. In addition, the local service provider indicates a routing preference for each line within each switch within the local service provider network. When a routing preference for a line exists, the routing preference for the line supersedes the routing preference for the switch.

According to a preferred embodiment, the local routing method also includes generating a billing record for each unbundled call that is routed according to the local service provider's preferences. The local routing method may also include generating a terminating access billing record for each unbundled call completed to a subscriber of the local service provider. The local routing method may also include generating an originating access billing record for each unbundled call originated by the subscriber of the local service provider.

According to a preferred embodiment, the local routing method also includes filtering all calls to predetermined numbers, thereby blocking the filtered calls from being analyzed, classified, and routed according to the local service provider's preference. Consequently, the filtered calls are routed according to the local exchange carrier's instructions.

A billing system is provided for generating originating billing in a telecommunications network according to a local service provider's usage. The local service provider provides service for telephone lines acquired from a local exchange carrier. The telecommunications network supports an originator subscribing to the local service provider. The billing system includes an originating trigger initiated by the originator upon placing an unbundled call, and a billing generator. The billing generator generates an originating access billing record for each unbundled call placed by the originator.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

Figure 1:
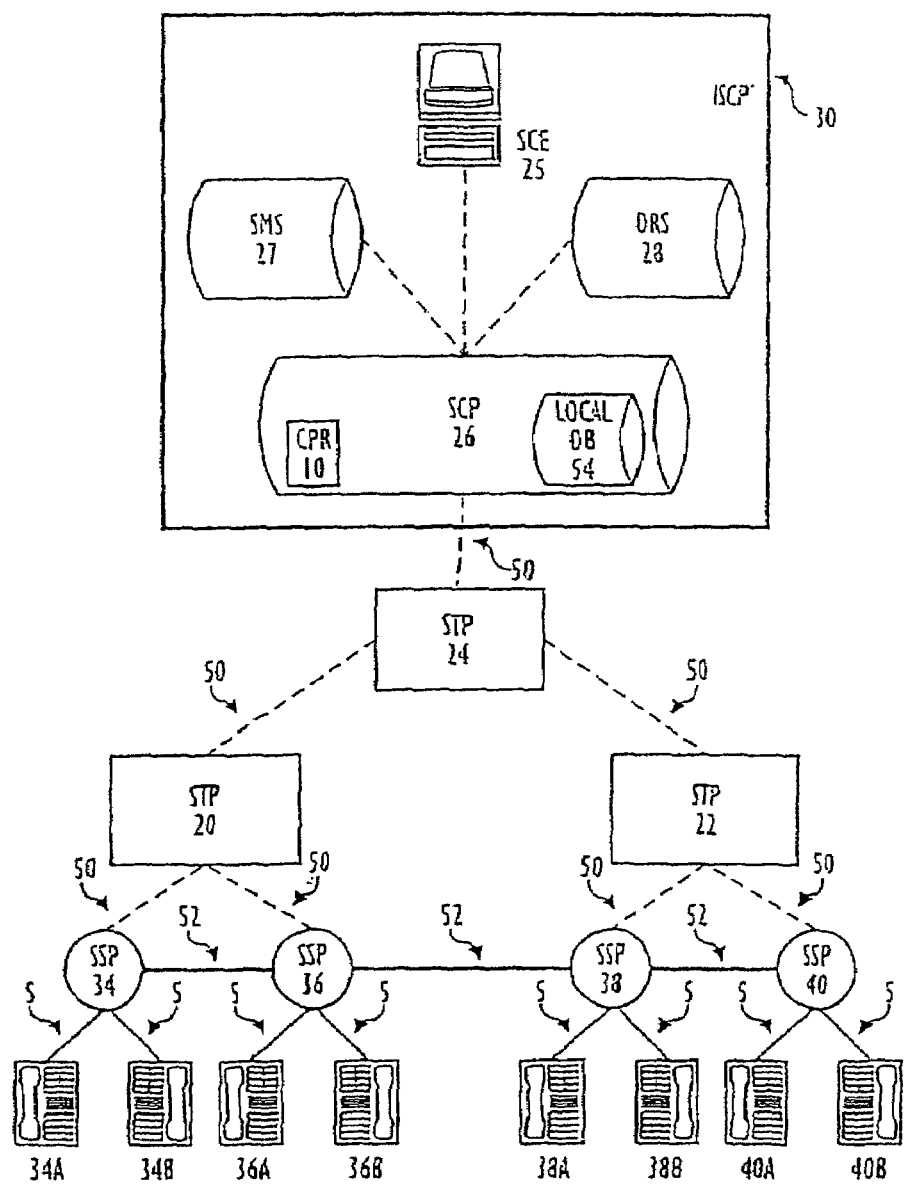
FIG. 1 illustrates in general block diagram form, an advanced intelligent network (AIN) system for implementing local routing system (LRS) features according to an aspect of the present invention.

A local routing system (LRS) is provided which enables an incumbent local exchange carrier (LEC) to route network traffic according to a local service provider's (LSP's) preferences. In a preferred embodiment, the LSP can route operator, directory assistance and local telephone call traffic depending on which facilities the LSP has established for itself Thus, when the LSP acquires services in addition to the services the LSP has facilities for, the LSP may route network traffic accordingly. Consequently, the LSP may freely acquire needed unbundled services or resold services from the incumbent LEC (or another provider) knowing that the network traffic can be properly routed.

Of course, the present invention is not limited to such types of traffic because any type of network traffic can be routed according to a service provider's preferences. For example, the system can be modified to handle interexchange carrier traffic (including directory assistance, operator, etc.) if an interexchange carrier, rather than a local service provider, would like its traffic handled. Also, intra-LATA traffic can be routed, etc.

Unbundled local switching (ULS) consists of central office switch hardware and software required to permit the transport or receipt of information over the incumbent LEC's local switching network. ULS is comprised of a ULS port (line or trunk) and originating and terminating usage. The ULS includes all basic capabilities available to the incumbent LEC (i.e., telephone number, signaling, vertical services, routing, etc.). Unbundled local switching occurs when the LSP buys on a piece-by-piece basis components for operating the service. Exemplary components are the switch, the dial tone, ringing, etc. Unbundled local switching typically requires billing on a per call basis.

Resale describes reselling an entire service. Typically, a flat rate is paid for the reselling. Thus, reselling is not usage sensitive and is simply reusing all of the LEC's established equipment including the loop, the switch port, switching capacity, and all features associated with the switch port. Resold services are complete services sold to the LSP.

After the LSP obtains telephone services either unbundled or through resale, the LSP wants to be able to route local traffic to its own facilities, if they have the capacity to handle the traffic. One difference between resold and unbundled services for the purposes of the present invention pertains to billing. For unbundled network services, the LSP must pay a usage fee whereas for resold network services the LSP plays a monthly flat fee independent of usage. Another difference pertains to the fact that LRR only routes local directory assistance traffic and local operator traffic.

Although local operator and local directory assistance traffic is referred to throughout this description, the LRS can be easily modified to include intra-LATA operator and directory assistance traffic, inter-LATA operator and directory assistance traffic, etc. Similarly the system can be modified to handle traffic other than local traffic, such as inter-exchange carrier traffic.

The LRS of the present invention is designed to handle both types of services. Thus, LRS actually encompasses two different systems, LRS for unbundled services (LRU) and LRS for resold services (LRR). Although the two systems are similar, they are treated differently because the network handles them differently.

LRS generally operates by analyzing a dialing pattern and called party number (CDN) collected from a telephone on one of the LSP's lines. Then, the collected information is classified as a type of traffic. Subsequently, a table look up is performed to determine the LSP's routing preferences for that type of traffic, and the traffic is routed in accordance with the LSP preferences. Finally, any necessary billing occurs. The billing information can be utilized to recover toll charges for long distance calls, and can also be utilized to charge the LSP for their subscriber's use of the LEC's switch port and local network.

The functionality provided by the present invention is invoked by subscribers obtaining service from a LSP and having the subscriber's line equipped with special translations (triggers) defined in the serving switch. The triggers required depend upon whether the customer's LSP is utilizing resold or unbundled network components. With some exceptions (discussed below) subscribers served by LSPs using resold services will be equipped with an originating trigger feature which will access the LRS logic on outgoing calls or incoming calls forwarded by switch based features such as call forwarding.

With some exceptions (described below), subscribers served by LSPs utilizing unbundled network components will be equipped with both an originating and terminating trigger feature. The originating trigger feature will invoke the LRS logic on outgoing calls (or forwarded calls) and apply the appropriate custom routing. Because the subscriber is served by unbundled components, the logic will also force a billing record to be generated so the LSP can be billed for the subscriber's use of the switch port. The terminating trigger will invoke the LRS logic to force the creation of a billing record for any completed incoming call to the subscriber so the LSP can be billed for the switch port usage.

In order to operate, the local routing system of the present invention requires special translations called triggers to be assigned within the switch serving the subscriber requiring custom routing and/or unbundled billing. For basic types of subscriber ports (e.g., single lines), triggers are assigned as pre-defined features in the serving switch via standard mechanized provisioning systems. For ports associated with centrex services and trunk ports, triggers are assigned manually. Once assigned, the trigger on the subscriber's port accesses the logic in the central database using the subscriber's ten digit telephone number as a key into the database.

Exemplary switches which may be utilized to implement the present invention are: the Lucent Technologies 1AESS, the Lucent Technologies 5ESS, the Ericsson AXE-10, and/or the Northern Telecom (Nortel) DMS-100 switches. In a preferred embodiment, the present invention applies to plain old telephone service (POTS) lines and centrex system lines, although LRS can function with any other type of telephone lines, such as ISDN and multi-frequency PBX systems. Generally, triggers should be applied on a per telephone number basis.

For switches other than 5ESS primary rate ISDN (PRI), LRU will utilize an off hook delay (OHD) trigger on all switch ports which are being sold on an unbundled basis to LSPs to provide routing service, if desired by the LSP, and to always create an originating automated message accounting (AMA) billing record. For POTS other than 5ESS PRI, LRR will utilize an OHD trigger on all switch ports which are being sold on other than an unbundled basis to LSPs to provide routing service, if desired by the LSP.

Terminating triggers will also be utilized to generate billing for line usage for LRU. Line ports utilized for POTS will utilize a terminating attempt trigger (TAT) feature assigned to the line. A trunk port will utilize a ten digit (10D) trigger assigned to all telephone numbers (e.g., direct inward dial (DID) numbers) routed to that trunk port.

Primary rate ISDN (PRI) subscribers utilizing LRS for customized routing require trigger translations against the trunk group in order to screen originating traffic. Terminating triggers are assigned per existing direct inward dial (DID) trigger provisioning practices (virtual TAT for DMS, 3/6/10 for 5ESS).

OHD triggers for DMS-100 switches are assigned to PRI trunk groups. For a 5ESS PRI switch, LRU will utilize a PRI B Channel (PRIBC) trigger on all PRI switch ports which are being sold on an unbundled basis to LSPs to provide routing service, if desired by the LSP, and to always create an originating AMA billing reference. For the 5ESS PRI, LRR will utilize a PRIBC trigger on all PRI switch ports which are being sold on other than an unbundled basis to LSPs to provide routing service, if desired by the LSP.

These POTS trigger requirements mean that LRU's OHD/PRIBC and TAT/10D triggers will always exist on all POTS switch ports which are being sold on an unbundled basis to LSPs because of billing. For POTS, LRR's OHD/PRIBC triggers will only exist if the LSP has active routing service.

Calling scopes and routing within centrexes are usually controlled by line class codes and/or common block translations which are unique to the centrex customer. Because, the translations are already unique and a resale approach does not require changes to originating or terminating billing, customized routing for resold centrex is more easily accomplished by altering the existing line class code and/or common block translations for the centrex rather than using the trigger approach. However, the LRS can be easily modified to operate with AIN for centrex LRR.

Unlike resold centrex, unbundled centrex benefits from the use of AIN because usage billing must be created for all completed incoming and outgoing calls, even if the calls are not being custom routed. Three trigger types are required to invoke the LRS logic for the different types of calls within the centrex environment. The customized dialing plan—access code (CDP-AC) is utilized to invoke LRS on calls which leave the centrex by dialing access codes associated with local calls (e.g., dial 9 calls), long distance calls (e.g., dial 8 calls), etc. The customized dialing plan—intercom access (CDP-IC) trigger is used to invoke LRS on calls to other stations within the same centrex. The TAT trigger is utilized to invoke LRS for incoming calls to stations within the centrex. The CDP-AC and CDP-IC triggers are defined within the common block translations of the centrex but require database entries for each station in the centrex. The TAT trigger is assigned as a feature against each individual station in the centrex, just like standard non-centrex lines.

Finally, for centrexes that share common dialing plans in a switch, it is necessary to segregate the customers with LRS from those without LRS. For example, if five different centrex customer share a common centrex dialing plan in a switch and one of the five centrex customers becomes an LSP customer with LRS, the centrex customer with LRS must be given its own dialing plan so as to prevent triggers from being set for the four remaining centrex customers. Therefore, a trigger calling party record (CPR) for each station within a centrex system must be established with a CDP module before the CDP trigger is established in a centrex common block. Translating the trigger without the associated trigger CPRs being activated in the ISCP will prevent all stations in the centrex from originating calls. Specific translations required to establish a CDP trigger for a given centrex will vary depending upon the customer's existing dialing plan.

Custom routing can also be applied to calls originated by two way PBX trunks, and basic rate ISDN (BRI) trunks by assigning an OHD trigger to the trunk group.

LRS operates within an advanced intelligent network (AIN) in response to the triggers described above. Preferably the triggers comply with AIN release 0.1 OHD and TAT trigger assignment in the AXE-10, DMS-100, 5ESS, and 1AESS switch types. The triggers allow call routing and enable billing the LSP for both origination and termination. For centrex systems, the logic is translated with the AIN R0.1 CDP trigger on the standard centrex access to public facilities and station to station dialing. For LRR, the logic is translated with the AIN R0.1 OHD trigger for POTS service. For centrex service the translation is with the AIN R0.1 CDP trigger assignment.

The DMS-100 requirements are now discussed. The DMS-100 should be on at least software release number NA005 to support LRS. Furthermore, the switch should have AIN specific software release number AIN00018, including AIN automatic callback/automatic call premium feature package activated. A table within the switch should be provided which indicates digits which will not cause a trigger to occur. Exemplary digits are 911, in which case if 911 is dialed, the OHD trigger does not occur. An AIN database will send a response to the DMS-100 containing the dialed number as well as an indication of special prefix digits which may have been dialed with the number, such as 0+, 10+, 00+, etc. Calls which fail to satisfy the dialing plan of the subscriber's line will be screened prior to encountering the OHD trigger and will reach the standard error announcements played by the switch without interacting with the AIN database.

The 5ESS switch should be on software release number 5E10 as a minimum in order to support LRS. The AIN database will send a response to the 5ESS containing the dialed number as well as an indication of special prefix digits which may have been dialed with the number, such as 0+, 10+, 00+, etc. Seven digit post query calls exist with the OHD and CDP trigger. Calls which fail to satisfy the dialing plan of the subscriber's line will be screened prior to encountering the OHD trigger and will reach the standard error announcements played by the switch without interacting with the AIN database. Thus, a post query screening index is not necessary on the OHD trigger number. In order to screen the incoming digits 911, local digit office dialing can be utilized. If the received digits match the digits in the switch, the call proceeds with normal call processing and an AIN trigger does not occur. Feature access codes automatically escape the OHD trigger.

The 1AESS should be on at least software release number 1A12 to support LRS. The switch must have the call forwarding via private facilities feature loaded. LRS logic in the ISCP is dependent on having operator identified in the nature of number (NON) queries from the 1AESS. Thus, the 1AESS requires an operator NON feature in order to include operator as NON in the query. Some codes such as 911 must be assigned as an escape code to prevent the AIN OHD trigger from occurring within the 1AESS. The AIN database will send a response to the 1AESS containing the dialed number as well as an indication of special prefix digits which may have been dialed with the number, such as 0+, 10+, 00+, etc. Calls which fail to satisfy the dialing plan of the subscriber's line will be screened prior to encountering the OHD trigger and will reach the standard error announcements played by the switch without interacting with the AIN database.

For an AXE-10 switch, the switch must have the functionally included in software release number L10R7.0 delivery 3, application system 305 in order for LRS to function. Escape codes should be provided within the AXE-10 switch corresponding to the escape codes utilized at the OHD trigger. If the received digits match the escape codes, the call proceeds to the normal call processing and the AIN trigger does not occur. The AIN database will send a response to the AXE-10 containing the dialed number as well as an indication of special prefix digits which may have been dialed with the number, such as 0+, 10+, 00+, etc. Calls which fail to satisfy the dialing plan of the subscriber's line will be screened prior to encountering the OHD trigger and will reach the standard error announcements played by the switch without interacting with the AIN database.

When an LSP elects to have an incumbent LEC's AXE-10 route operator traffic, the AXE-10 requires two routing indexes. One routing index is for 0-, and the other routing index is for 0+ local and 0+411. Both routing indexes may share the same trunk group. The trunk group, at the option of the LSP, may also be shared with directory assistance traffic. The two routing indexes are required because the post query manipulation of 0- is different than for 0+ local and 0+411 within the AXE-10.

LRS is available to LSPs for both LRR and LRU. However, LRR is only offered on a flat rate basis and therefore does not require any additional billing information. All LRU ports, however, require billing to be generated to bill usage to the LSP. The basic AIN billing record indicates that billing is occurring for LRU. Due to potential interactions with other features implementing billing records when LRU is involved, the billing record will be modified when multiple AIN services are encountered on a per call basis. The modified billing record indicates what other features are being utilized as well as whether the originating line is from the LSP or the incumbent LEC, and whether or not there is terminating usage.

In order to implement LRS, the LSP must identify its routing preferences for each of the LEC's offices serving the LSP's subscribers. An ID number (or alternate exchange carrier number (AECN)) for the LSP is incorporated into the table name. By including the LSP ID number in certain variables, discussed below, the necessary link between the call, trigger, variables and LSP routing table is provided. In a preferred embodiment, the following fields are provided within the LRS routing table: the signaling point code (SPC) for each switch which the LSP purchases LRR or LRU, the office route to which the LSP wants all local operator calls sent, the office route to which the LSP wants all local directory assistance calls sent, the office route to which the LSP wants all local traffic calls sent (LRU only), and in the case of the AXE-10 switch the office route to which the LSP wants all 0-calls sent. An exemplary LRS routing table is illustrated below in Table 1.

TABLE 1

| ID #-LSP 1 | SPC | DESTINATION | ROUTING INDEX |
|---|---|---|---|
| (switch #1) | 249-019-123 | OPERATOR | 00000123 |
| (switch #1) | 249-019-123 | DA | 00000132 |
| (switch #1) | 249-019-123 | OTHER | 00000118 |
| (switch #2) | 249-019-126 | OPERATOR | 00000432 |
| (switch #2) | 249-019-126 | OPM | 00000433 |
| (switch #2) | 249-019-126 | OTHER | 00000118 |

If the LSP is only a reseller of lines and does not have LRR, the LSP does not have an LRS routing table. Similarly, if an LSP has only ULS ports and does not have LRU routing, the LSP will have an LRS routing table without any entries. Each SSP with LSP defined routes for operator, directory assistance, or other local traffic has its SPC (which in SS7 terms is the originating point code (OPC) for the AIN R0.1 query from the SSP to the ISCP) in the second column of the LSP's LRS routing table (the first column is only included for illustrative purposes to correspond the SPC to a specific SSP). The SPC should be in the LRS routing table once for each type of traffic that the LSP wants routed. Thus, the maximum number of times the SPC will occur in an LSP's LRS routing table is three times. However, in AXE-10 switches the addition of the 0-(OPM) type makes the maximum four times.

The third column within the LRS routing table is for the destination. Valid entries for the destination column are OPERATOR for 0, 0+ local, and 0+411 operator traffic for the DMS-100, 5ESS and 1AESS switches and for the 0+ local, and 0+411 operator traffic for the AXE-10 switch; OPM for 0 operator traffic for the AXE-10 only; DA for directory assistance traffic; and OTHER for other local traffic.

The last column in the LRS routing table contains the routing index. Valid entries for the routing index column are the 8 digit routing index which conform to the rules for routing indexes that exist for AXE-10, DMS-100, 5AESS and 1AESS switches.

When provisioning LRS, the LSP should also provide: the telephone number utilizing LRR or LRU, whether LRR or LRU is desired, the local calling scope of the telephone number, and the LRS level, i.e., whether operator, directory assistance, local or any combination of these types of traffic will be routed, or whether only billing occurs.

The local routing system (LRS) is now described with reference to the accompanying drawings. First, a general description of an advanced intelligent network (AIN) in which the local routing system can be provided is described. Many telephone services may be provided using an AIN or AIN type network which permits centralized control of telephone services offered to subscribers, as opposed to localized control of services at the switch or central office (CO). The AIN system is provided through interaction between service switching points and other systems supporting AIN logic.

The AIN based routing system of the present invention may be implemented using at least AIN Release 0.1 protocol in a public switched telephone network-equipped with SS7 trunk functionality and a service control point (SCP) capable of processing AIN 0.1 queries transmitted via SS7 and TCAP (transaction capability application part) protocols. A local database (LDB) and AIN database can be provided by separate platforms, if desired, or by an integrated platform. Each switch serving a subscriber equipped with LRS must have the appropriate SS7 and AIN functionality configured and active. The AIN based system essentially employs an upper-level software network through the SSPs and the SCP. The upper-level software resides over the service hardware to determine the routes which the switch will attempt to utilize.

Although the various embodiments of the invention described herein make reference to particular AIN implemented features and structures, other AIN and AIN type architectures and components may be substituted to provide and implement the present invention.

Referring now to the accompanying drawings, FIG. 1 illustrates a general block diagram of an advanced intelligent network in which the LRS is embodied in accordance with an aspect of the present invention. In FIG. 1, local telephone lines 5 connect a plurality of individual network locations 34A-40B in each geographic area to the closest central office (CO) or end office (EO) 34-40.

End offices 34-40 are equipped as AIN service switching points (SSPs) to allow normal switch call processing to be suspended at specific points in a telephone call, enabling TCAP formatted query and response messages to be transmitted between the SSP and ISCP 30. AIN queries will be routed from a central office or SSP 34-40 to a local signaling transfer point (STP) 20,22 using existing SS7 links. These queries will then be routed from the local STP 20,22 to the regional STP 24, and from the regional STP 24 to the ISCP 30. The SS7 message routing should be devised to minimize the need for data administration at the local and regional STPs 20-24. A capability code may be established at the STPs 20-24 that serve the ISCP 30. This capability code is utilized by the SSPs 34-40 and the STPs 20-24 to do point code routing until the message is received by the "last" STP pair (that is, serving the SCP). STPs 20-24 within the network are equipped to route AIN SS7 messages from SSPs 34-40 to ISCP 30 based upon six digit global title translations. For example, the NPANXX of the originating calling telephone number may be translated by the STP 20-24 to a destination point code (DPC) of the ISCP 30 running the LRS.

The SSPs 34-40 may include, but are not limited to, AXE-10, 5ESS, 1AESS, and DMS-100 switches. The trigger on the 5ESS switch may be an AIN type OHD trigger, although more specific trigger requirements are discussed elsewhere. The trigger may be based upon AIN Release 0.1 protocol, and preferably AIN Release 0.1 query variables are utilized by a call processing record (CPR) 10 in the ISCP 30 to determine call routing.

Triggers in switches may have certain identifiable parameters, including the telephone number with the trigger, that permit the SSP 34-40 and ISCP 30 to synchronize their mutually supporting activities. On its end, the ISCP 30 utilizes the trigger identifiable parameters to select the proper CPR to implement the call routing For purposes of illustration, four SSPs are shown in FIG. 1. The actual network may be provisioned with more (or less) than the number of SSPs shown in FIG. 1. The SSPs 34-40 are switches which perform the following function: recognize AIN-type calls; launch queries to the ISCP 30; and receive commands and data from the ISCP 30 to further process and route AIN-type calls. When one of the SSPs 34-40 is triggered by an AIN-type call, the SSP formulates an AIN service request and responds to call processing instructions from the network element in which the AIN logic resides. The AIN logic or control software may reside in a database at a service control point (SCP) 26. The SSPs 34-40 are connected by trunked communication lines 52 which connect and carry communications, e.g., voice and/or data, from a calling party to a called party.

In FIG. 1, the SSPs are shown equipped with common channel signaling (CCS) capabilities, e.g., signaling system 7 (SS7), which provides for two-way communications of data messages between each SSP 34-40 and the ISCP 30 via CCS links 50. The data messages are formatted in accordance with the transaction capabilities applications part (TCAP). As shown in FIG. 1, each SSP 34 and 36 may be connected to a first local area STP 20 by SS7 link 50; and each SSP 38 and 40 may be connected by SS7 link 50 to STP. The connections by links 50 to the STPs 20-24 are for signaling purposes, and allow the SSPs 34-40 to send and receive messages to and from the ISCP 30 via the STPs 20-24. Each of the STPs 20-24 can be connected to a large number of other STPs. For purposes of illustration in FIG. 1, SS7 links 50 are shown as connecting local STPs 20, 22 to a regional STP 24, and connecting the regional STP 24 to the ISCP 30.

The ISCP 30 is an integrated system which may include a service management system (SMS) 27, a data and reports system (DRS) 28, a programmable service control point (SCP) 26, and a service creation environment (SCE) 25, such as Bellcore Service Provisioning and Creation Environment Network Element (SPACE). The SCE 25 is a software based terminal that may be implemented to work with the SMS 27 to create, modify, and load service control software (i.e., logic) into the database in the SCP 26. The SCP 26 executes software-based logic and may return call routing instructions to the SSPs. The SMS 27 is provided to provision customer CPRs and data. The DRS 28 may be provided for compiling calling information to be utilized for billing and administrative purposes. By way of example, the ISCP 30 may be implemented with the Bellcore Integrated Service Control Point (ISCP), loaded with preferably at least ISCP software version 5.0.7, available from Bell Communications Research, Inc., of Livingston, N.J.

The SCP 26 may be linked to a local database (LDB) 54 that stores various routing information, e.g., information for determining whether a called number is local or toll. The local database 54 preferably resides within the ISCP 30.

AIN call processing differs from standard telephone call processing in that a query to a centralized database, e.g., ISCP 30, is triggered by an AIN application. In AIN type call processing, an SSP is responsible for identifying calls associated with AIN services, detecting when conditions for AIN service involvement are met, formulating service requests for call processing instructions, and responding to the instructions received. With AIN call processing, the call may be suspended at the calling party's end office or switch equipped as an SSP and may send a data message, via the SS7 links, to the STPs to establish the call route. AIN services are created by assigning appropriate SSP call suspension points, known as AIN "triggers", accessed via customer lines or telephone numbers, and accessing customer or service specific logic in the ISCP 30. The SSPs launching the AIN queries are preferably end office AIN SSPs, 34-40.

For purposes of illustration, assume that a customer at location 34A desires to call a business having a main office at 36B. The customer picks up the receiver at 34A and gets a dial tone from SSP 34. The customer may dial the telephone number of the business, e.g., 987-6543, from originating location 34A, ultimately offering connection to the office of the business, e.g., location 36B. The AIN trigger may be established in the SSP originating end office that serves the NXX of the caller, i.e., end office 34. In FIG. 1, SSP 34 receives the call and is triggered. As a result, SSP 34 launches a message, over links 50, to query SCP 26. SCP 26 then responds back to SSP 34 with routing information, and SSP 34 routes the call over trunks 52 to SSP 36. SSP 36 rings location 36B, and the business at location 36B may answer to complete the communication path.

Upon receiving the query message from the AIN SSP equipped end office 34, the ISCP 30 executes software based logic programs stored in the SCP 26 to perform subscriber functions, e.g., determining routing information based upon the LSP's preferences, and returns a response to the end office 34 with call routing instructions to forward the call appropriately. The AIN service application, e.g., CPR 10, may be stored in an ISCP database, e.g., the SCP 26, and accessed by a predetermined SSP query launched from the triggering location, e.g., location 34. The CPR 10 contains the logic for each trigger necessary to effect appropriate call routing.

When the ISCP 30 receives a query, the advanced intelligent LRS routing logic will be executed. Call data may be collected and recorded in the DRS 28, as per the normal ISCP measurement node operation. For example, the ISCP 30 may contain resident service software that collects ISCP usage data.

After the ISCP 30 has collected the call data, the ISCP 30 returns control of the call to the call suspending SSP, with proper routing information, for completion (i.e., routing). Once the logic has been completed, control of the originating call returns to the triggering SSP.

The trigger CPR requires some provisionable variables. A service type variable is necessary to indicate whether a telephone number is an LRS subscriber. The service variable typically has only two possible values: R signifying the telephone number is an LRR subscriber and U signifying the telephone number is an LRU subscriber. The service variable cannot have a value permitting both LRR and LRU to exist at the same time, as they are mutually exclusive.

Another provisionable variable indicates the LSP for a particular telephone number. The LSP variable facilitates billing and determining which LRS routing table is utilized.

A calling scope variable is necessary to indicate a dialing plan for the telephone number which uniquely identifies a local call scope. The value of the calling scope variable enables determining which local database dialing plan to utilize for local versus intra-LATA toll determinations.

The LRS system of the present invention is capable of working with host and remote switches. Consequently, another provisionable variable required is the remote point code variable. The remote point code variable is utilized for subscribers served by certain 5ESS remote switches equipped with direct trunk groups, and other remote switches which do not uniquely distinguish the remote from its host in the originating point code value sent with an AIN query. The remote point code variable can be utilized to override the host point code sent in queries, and facilitates selecting the desired routes in the remote switch. For most subscribers, this variable will contain all zeroes (000-000-000) which will cause the originating point code of the AIN query to identify the routes for that LSP in the subscriber's switch. If the subscriber is served by a 5ESS remote switch with direct trunks, using the originating point code would cause trunks from the host switch, instead of the remote switch, to be selected. The remote point code variable, if set to something other than 000-000-000, is utilized to select routes for the remote switch and override the routes associated with the host switch.

Another provisionable variable is the LRS level variable which controls the line level routing option permitting a specific LSP line to have different operator, directory assistance, and local traffic routing. In a preferred embodiment, the default value of the LRS level variable is zero. Because an unbundled line may exist without routing, the value of zero only applies to LRU which still requires billing. For LRR, no default value is necessary because customized routing is required (i.e., no billing occurs). When the value of the LRS level variable directs the system to perform routing for a service such as directory assistance, and no routing has been defined for the LSP at the end office serving the line, default LRS logic performs routing to the LEC facilities. However, for the 1AESS switch type, even the LEC handling of the operator traffic must be in the LRS table. Alternatively, the information can be in a table within a feature interaction manager (FIM) (discussed below). When the value of the LRS level variable indicates a route, e.g., OTHER, that does not exist at the LSP level for that end office, LRS logic will utilize incumbent LEC routes for that type of traffic regardless of whether the traffic is operator, directory assistance, or local traffic. According to a preferred embodiment, possible values for the LRS level variable are shown in the Table 2 below.

TABLE 2

| Value | Definition | Applicability LRU | Applicability LRR |
|---|---|---|---|
| 0 | No Custom Routing | X | N/A |
| 1 | Operator Only | X | X |
| 2 | Directory Assistance Only | X | X |
| 3 | Operator and Directory Assistance Only | X | X |
| 4 | Local Traffic | X | NA |
| 5 | Operator and Local Traffic Only | X | NA |
| 6 | Directory Assistance and Local Traffic Only | X | NA |
| 7 | Operator Directory Assistance and Local Traffic | X | NA |

Whenever a lookup in the LRS routing table is required, the LRS level value is first checked to determine whether the lookup is necessary. For example, when telephone one number 512-372-5450 has an LRS level of two, and the logic indicates a lookup in the LRS routing table for a local routing index should be made, the lookup will not occur because the LRS level of two does not include local traffic. However, when the telephone number 512-372-5450 has an LRS level of twos and the logic indicates a lookup in the LRS routing table for a directory assistance routing index, the lookup occurs because an LRS level of two includes directory assistance traffic.

Three additional provisionable variables are also provided in the trigger CPR for a telephone number with LRU for direct inward dial (DID) customers. DID is a trunk related terminating service and is therefore not an issue for LRR. First, a provisionable variable is necessary to indicate whether or not the telephone number is part of a DMS-100 DID trunk group. If the telephone number is part of a DMS-100 DID trunk group, an additional variable should be provided to indicate whether seven or ten digits is required for that DMS-100 DID trunk group. Finally, a variable should be provided which indicates the route index to the DID trunk.

Traffic is defined as three types in a preferred embodiment: operator, directory assistance, and local. Operator traffic includes calls originated by dialing 0, 0+telephone number and 0+411. Directory assistance traffic includes calls originated by dialing 1+411, and a home NPA+555-1212. The home NPA is the NPA of the calling party. For example, if 314-235-1234 dials their home NPA directory assistance, they would dial, 314-555-1212. Local traffic includes all calls to another telephone number which do not incur any toll charges. Thus, local is defined to be those calls within the free calling scope of the originating NPANXX. In another embodiment, local traffic also includes calls which are free due to optional calling plans.

Thus, LRS is an optional service which enables LSPs to route traffic according to the LSP's preferences. Furthermore, an LSP may purchase LRS only for the traffic type desired. For example, LSP 1 may decide to handle operator and directory assistance and not local traffic, whereas LSP 2 can decide to handle only local traffic. It is important to note that the other end of trunk groups carrying any type of traffic from the LEC's switch must terminate on facilities other than the LEC's facilities. Thus, it is an option for LSP 1 to route the traffic to an operator system, directory assistance system, or switch owned by someone other than the LSP, but the traffic cannot be routed back to the LEC's switch. If an LSP does not employ LRS at all or does not employ LRS for one or more traffic types, the LEC will by default, route the LSP's local traffic like it does its own local traffic, and bill the LSP accordingly.

It is possible for an LSP to employ LRU and LRR simultaneously, but any particular line may only have LRR or LRU. The LSP should utilize a different alternate exchange carrier number (AECN) for LRU and LRR.

For a given SSP, an LSP may share the same operator and directory assistance routing for both LRU and LRR. (The local routing is exclusive to LRU.) Thus, the operator and directory assistance traffic can share a trunk group at the LRS subscriber's option as both are multi-frequency (MF) with an operator signaling trunk group type known as modified operator service signaling (MOSS). However, it is not possible to combine local traffic with either operator or directory assistance because local traffic flows through SS7 trunks. In addition, an LSP may set a route for a SSP and prevent the route from being utilized by setting an alternative route at the line level. For example, all LRU customers of the LSP can have a line level that permits routing to the route set in the SSP (e.g., the LSP's facilities) while all LRR customers of the LSP in the same SSP can have a line level that routes the call elsewhere (e.g., to the LEC system). In another example an LSP has one business line and one residence line. The LSP could have the business line sent to the LSP operator and the residential line sent to the LEC operator.

LRS interacts with existing translations utilized to route calls originated by the LSP subscriber. After allowing the switch to perform the appropriate pre-query screening to block incorrectly dialed calls, LRS augments the routing of the selected classes of traffic by selecting routes specified by the LSP, instead of routes derived from the switch based line class code. The design allows LSPs to utilize LSP routes in some switches, and incumbent LEC routes in other switches by providing or omitting overriding route information, as desired for each switch. Thus, the intent is for LSPs to utilize existing LEC local network functionality without chance when it comes to call processing unless the ISCP includes a route index in the response to the switch.

The OHD trigger is utilized for most originating call scenarios. A TAT trigger is utilized for most terminating call scenarios. The OHD trigger analyzes the dialing party and called party number to determine if a routing index should be returned. The OHD trigger also causes an automatic message accounting service logic program identification (AMAslpID) parameter to be returned along with other billing information to the SSP. The SSP then generates a billing record for the originating unbundled call. The TAT trigger will only cause an AMAslpID to be returned along with other billing information to the SSP.

For centrex, the OHD, custom dialing plan access code (CDP-AC), and custom dialing plan intercom code (CDP-IC) triggers are utilized for all LRS originating call scenarios. This specific trigger varies by switch type and by originating call scenario, e.g., station to station, 9+escape code to outside the centrex, etc. For LRU, the TAT and 10D trigger is utilized for terminating call scenarios. The OHD, CDP-AC and CDP-IC triggers are utilized to analyze the dialing pattern and CDN to determine if a routing index should be returned. The OHD trigger causes an AMAslpID to be returned along with other billing information to the SSP. The SSP generates a billing record for the originating unbundled call. The TAT and 10D trigger only causes an AMAslpID to be returned along with other billing information to the SSP.

Figure 2:
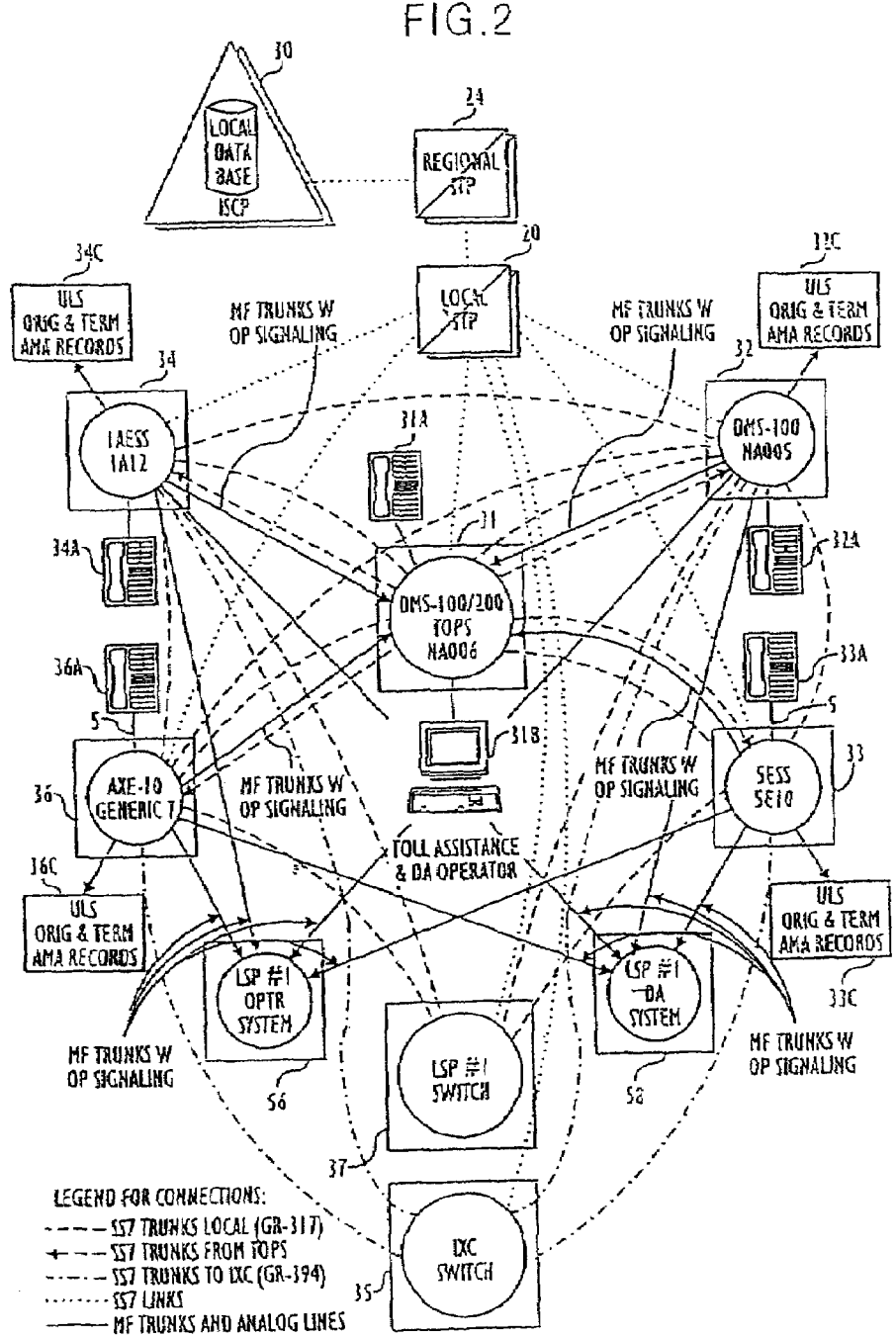
FIG. 2 illustrates an exemplary network architecture for LRS for unbundled services (LRU) with one example LSP, according to an aspect of the present invention.

Referring now to FIG. 2 an exemplary network architecture for LRU with one LSP is described. The local STP 20 is connected to multiple end offices/SSPs 31-34, 36, 37 via SS7 links which allow SS7 protocol signaling. Although FIG. 1 shows four end offices 34-40, a network is not limited to only those end offices shown, thus, FIG. 2 shows six end offices 31, 32, 33, 34, 36, 37. In FIG. 2 the end office, SSP 34, is shown more specifically as a Lucent Technologies 1A Electronic Switching System (1AESS) switch and the end office/SSP 36 is shown more specifically as an Ericsson AXE-10 digital switch. End office 31 is shown as a Nortel digital multiplex system (DMS) 100/200 traffic operating position system (TOPS), end office/SSP 32 is shown as a Nortel DMS 100 switch, and end office/SSP 33 is shown as a Lucent Technologies 5ESS switch. Further, end office/SSP 37 is shown as the switch for handling local traffic for the new LSP 1. IXC switch 35 is shown as an interexchange carrier (IXC) switch.

Each of the switches 31, 32, 33, 34, 36 is shown connected via an analog line 5 to a telephone 31A, 32A, 33A, 34A, 36A. The DMS 100/200 TOPS switch 31 is also provided with the LEC's toll assistance and directory assistance operator system 31B. Each of the LEC's switches 32, 33, 34, 36 are connected to the DMS 100/200 TOPS switch 31 with multi frequency trunks with operator signaling, and from the DMS 100/200 TOPS switch 31 to the LEC's switches 32, 33, 34, 36 with an SS7 trunk. A two-way SS7 local trunk such as a GR-317 also runs between the DMS 100/200 TOPS, and each of the LEC's switches 32, 33, 34, 36. Each of the LEC switches 32, 33, 34, 36 is also connected to the IXC switch 35 with an SS7 trunk such as a GR-394. Each of the incumbent LEC switches 32, 33, 34, 36 is also connected to a storage facility 32C, 33C, 34C, 36C where the originating and terminating AMA records for the unbundled local switching can be stored and sent to downstream systems for billing purposes. A storage facility 31C may also be attached to switch 31, however, it is not shown in the drawings. Furthermore, switch 31 can be connected to switch 37 and systems 56, 58 in the manner that switches 32, 33, 34, 36 are connected. To keep the drawing from becoming overly cluttered, these connections are not shown.

In addition to the switch 37 of the new LSP 1, in the example shown in FIG. 2, LSP 1 also has its own operator system 56 and directory assistance system 58. Thus, in the example shown in FIG. 2, LSP 1 is capable of handling directory assistance traffic, operator traffic and local traffic. Accordingly, the operator system 56 and the directory assistance system 58 are connected with multi frequency trunks with operator signaling to each of the incumbent LECs switches 32, 33, 34, 36. Thus, each of the LEC switches 32, 33, 34, 36 is able to route operator and directory assistance traffic to LSP 1 via multi frequency trunks with operator signaling and to the LSP 1 switch 37 via SS7 local trunks for local traffic.

In this example, the LRU network architecture is able to handle-complex dialing plans, multiple classes of service, and feature interaction between LRU, and switch based and AIN services. The system sorts through the possibilities and connects operator, directory assistance, and local calls to the proper trunk groups on an LSP by LSP basis.

Figure 3:
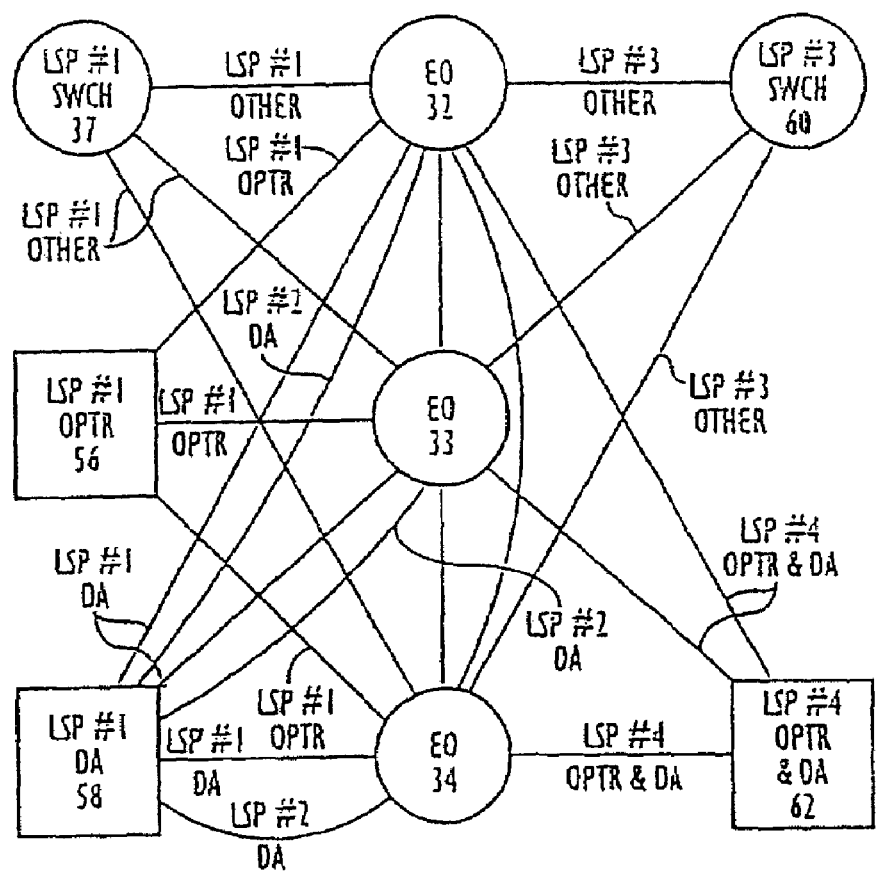
FIG. 3 illustrates an exemplary network architecture for LRU with four example LSPs, according to an aspect of the present invention.

FIG. 3 shows a situation in which four new LSPs have acquired unbundled lines from the incumbent LEC which is shown with three end offices 32, 33 and 34. For the example shown in FIG. 3, LSP 1 handles its own operator, directory assistance and local traffic. LSP 2 utilizes LSP 1's directory assistance system, and does not require routing for operator or local traffic. LSP 3 routes only local traffic, and utilizes the incumbent LECs directory assistance and operator facilities for directory assistance and operator services. LSP 4 handles its own operator and directory assistance traffic and utilizes a single trunk group for the routing of both operator assistance and directory assistance traffic. Thus, as shown in FIG. 3, the incumbent LEC switches 32, 33, 34 each have a connection to LSP 1's switch 37, LSP 1's operator system 56 and LSP 1's directory assistance system 58. In order to route LSP 2's directory assistance traffic, a separate line connects LSP 1's directory assistance system 58 and each of the incumbent LECs end offices 32, 33, 34. LSP 3 has a link connecting each of the LEC's end offices 32, 33, 34 to LSP 3 switch 60 enabling local traffic to be routed to LSP 3's facilities. LSP 4 is shown with a combined operator and directory assistance system 62, and consequently has a single trunk connection to each LEC end office 32, 33, 34. Each LEC switch 32, 33, 34 is also connected with each other LEC switch 32, 33, 34.

Figure 4:
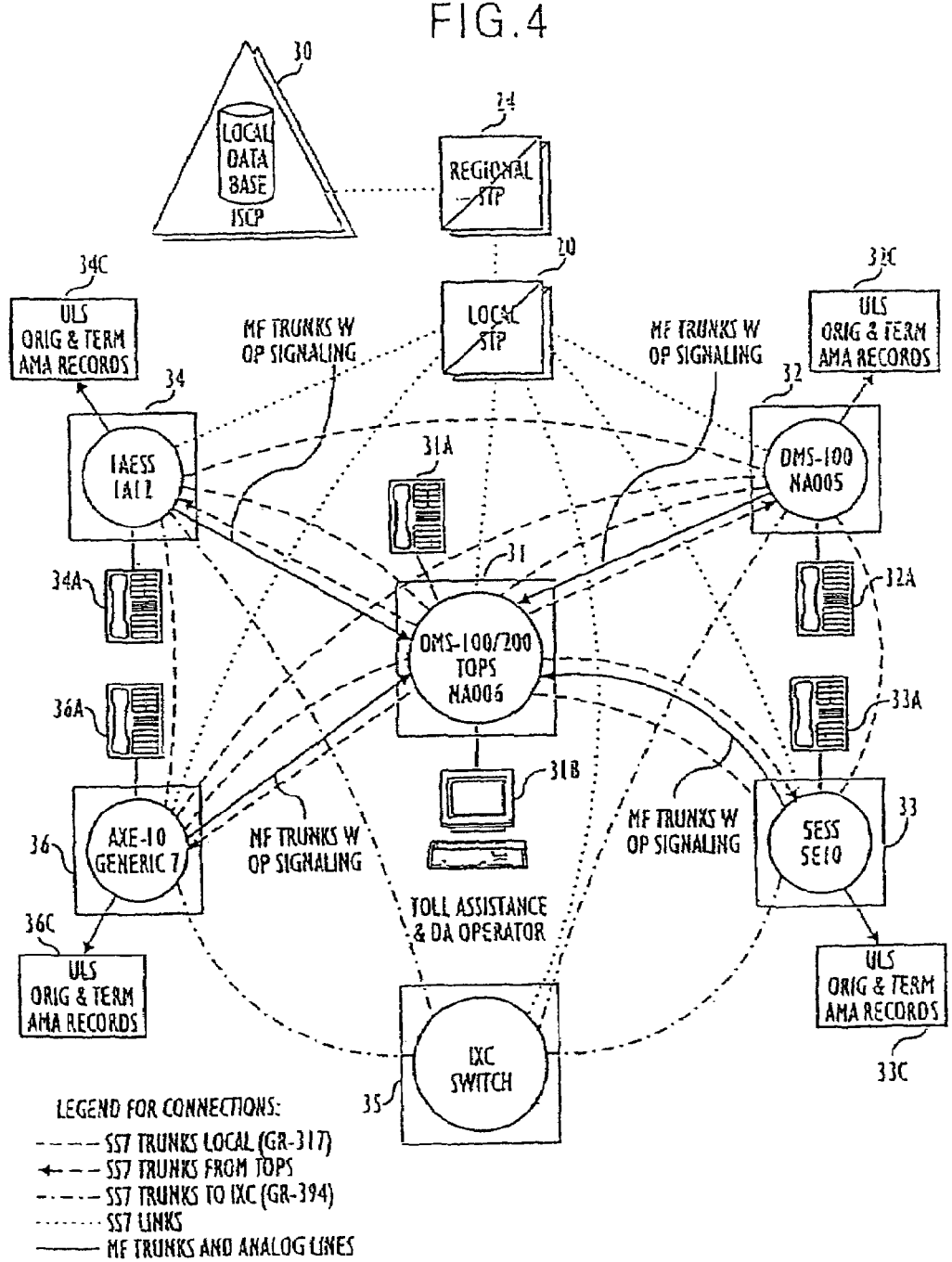
FIG. 4 illustrates an exemplary-billing only network architecture for LRU with one example local service provider (LSP), according to an aspect of the present invention.

For situations when an LSP only requires billing from the incumbent LEC, a network architecture such as that shown in FIG. 4 may be implemented. In other words, FIG. 4 shows the LRU network architecture for an LSP handling none of the three traffic types. FIG. 4 is similar to FIG. 2 except that no LSP 1 switch, LSP 1 operator system, or LSP 1 directory assistance system are provided. Although an LRU billing only system does not have any trunk groups associated with it (nor routing indexes), the system should be provisioned just like an LRU system with routing to enable easy implementation when the LSP becomes a user of LRU with custom routing.

Figure 5:
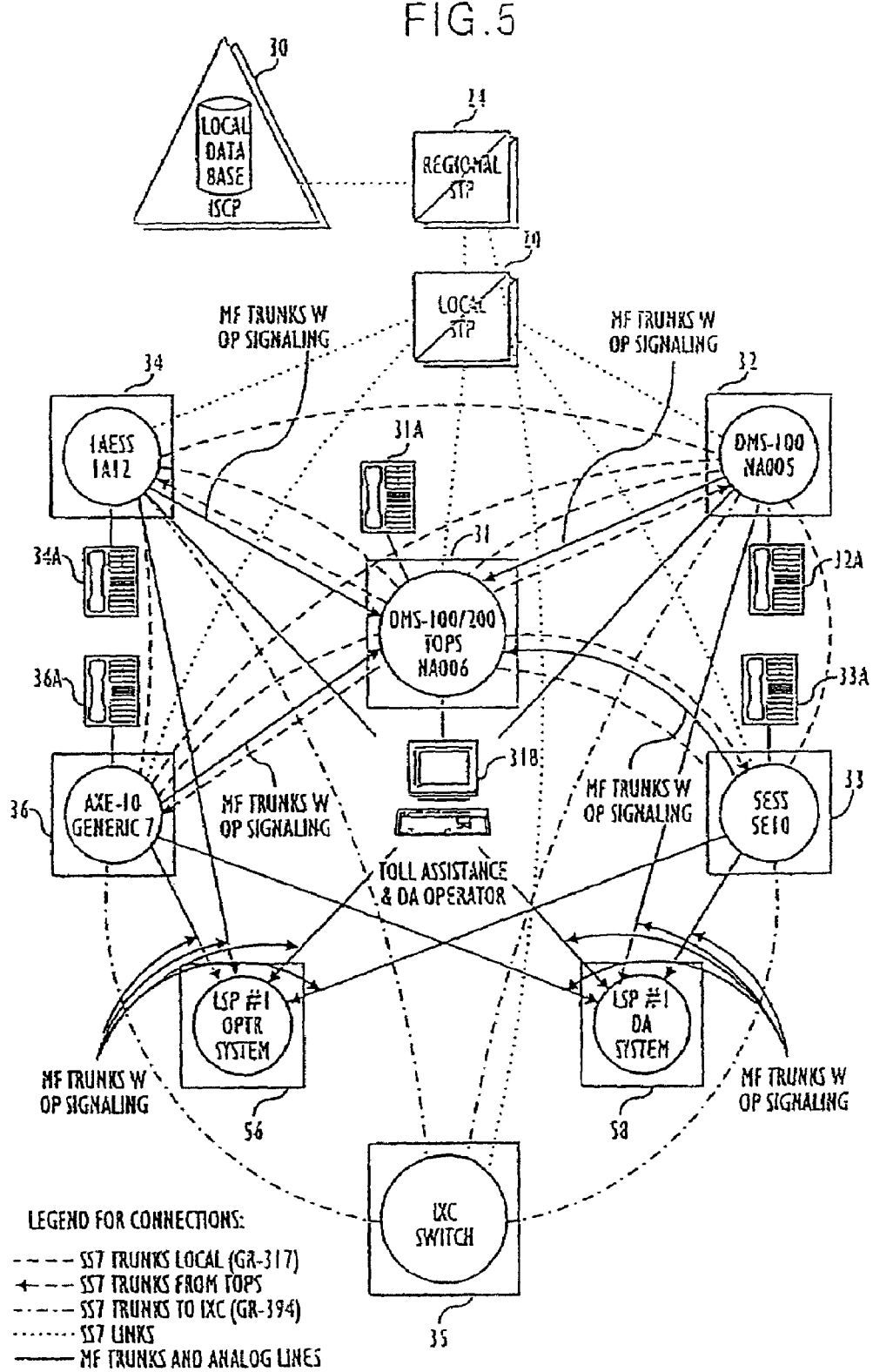
FIG. 5 illustrates an exemplary network architecture for LRS for resold services (LRR) with one example LSP, according to an aspect of the present invention.

FIG. 5 shows an exemplary network architecture for LRR. FIG. 5 is similar to FIG. 2 except that no storage for billing records 32C, 33C, 34C, 36C is necessary because no billing records are generated for LRR. Moreover, LRR does not support local traffic routing, therefore no LSP 1 switch is required.

Figure 6:
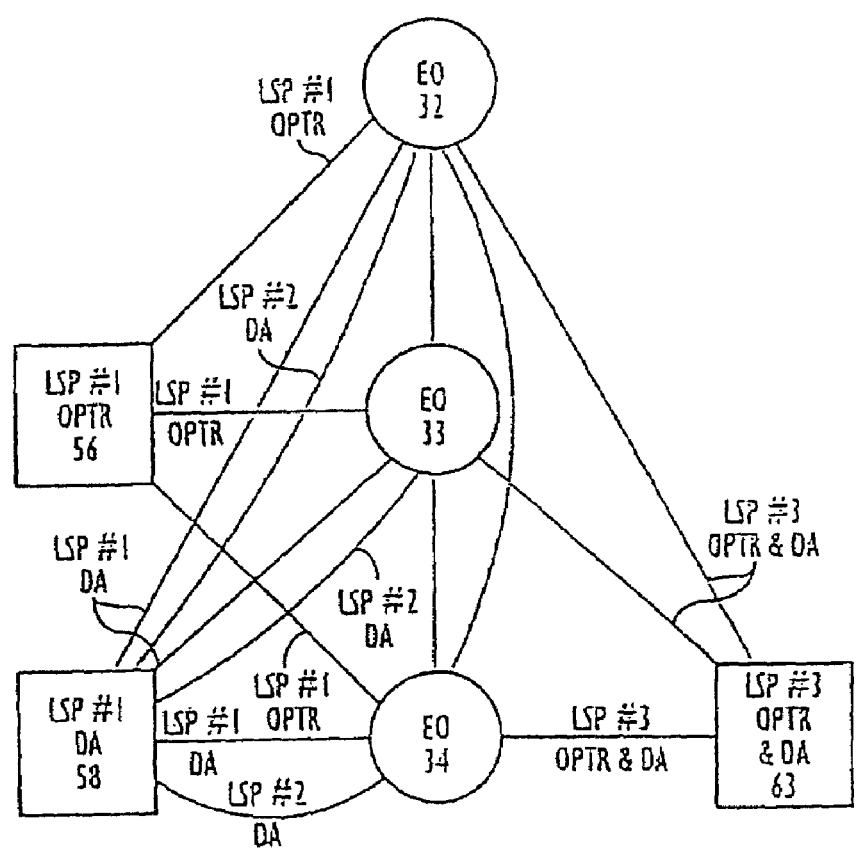
FIG. 6 illustrates an exemplary network architecture for LRR with three example LSPs, according to an aspect of the present invention.

FIG. 6 shows an exemplary network architecture for LRR with three LSPs. LSP 1 handles its own operator and directory assistance traffic, LSP 2 has its directory assistance traffic routed to LSP 1's directory assistance system and LSP 3 handles its own operator and directory assistance traffic. LSP 3 utilizes the same trunk group for both types of traffic. Thus, end offices 32, 33, 34 of the incumbent LEC have trunk connections to LSP 1's operator system 56 and LSP 1's directory assistance system 58. Each LEC end office 32, 33, 34 also has an additional trunk connection to LSP 1's directory assistance system for routing of LSP 2's directory assistance traffic. Each of the LEC end offices 32, 33, 34 has a single trunk connection to LSP 3's operator and directory assistance system 63. Finally, each LECs end office is connected with the other LEC end offices, i.e., end office 32 has a trunk connection to end office 33 and 34, and end office 33 has a trunk connection to end office 32 and end office 34.

According to a preferred embodiment, LRS is compatible with line related and trunk related switch based features such as call waiting, call forwarding, speed calling, direct inward dial (DID), etc.

For centrex systems, station to station calls will not trigger LRS except for LRU, which requires originating billing to be generated. When the 9+escape code to an outside line is handled by the ISCP, LRS acts as if the 9+ did not exist and the OHD logic is applied. These 9+ calls are diverted to the operator, directory assistance or local facilities when necessary. Of course, if LRU applies to the call, then an originating billing record is also generated.

Because LRS is only applied to local calls, a filtering function is applied to distinguish local calls from intra-LATA toll, inter-LATA toll, and international calls. International calls can be identified through the nature of number (NON) associated with the called number (CDN). Inter-LATA calls can be identified through the NON associated with the CDN, and the use of an ISCP supported NPANXX table. The table maps each NPANXX to a specific LATA. If necessary, the table can be utilized twice, once to get the LATA of the calling party number (CPN) and once to get the LATA of the CDN. However, the LATA of the CPN should come up in the query from the SSP to the ISCP, and only one lookup is typically required. If the LATAs are not the same, the call is determined to be an inter-LATA call.

Local and intra-LATA toll calls are not so easily distinguished. CDNs with seven digits and a NON of subscriber can be treated as local. However, ten digit local dial plans also exist. In fact, the only local dial plan for 0+ is ten digits. Furthermore, NPA splits in overlays and major market areas have led to the use of more ten digit local dial plans. The NON for all ten digit dialing is national so NON is not an adequate discriminator between local, intra-LATA toll or inter-LATA.

According to a preferred embodiment of the present invention, a local database (LDB) can be utilized to define all valid local call scopes for an originating NPANXX. Every originating NPANXX has an associated local calling scope. Furthermore, optional local calling scope plans may exist to which a line and an NPANXX may subscribe. If a line does subscribe to such a plan, the NPANXXs that the line can reach from the originating NPANXX are predefined for the plan. Thus, LRS will utilize the LDB when necessary to discriminate between local and intra-LATA calls that are dialed with ten digits. The database contains the local calling scope for every NPANXX. Thus, a simple lookup will be able to determine whether the call is local or intra-LATA toll.

Figure 7:
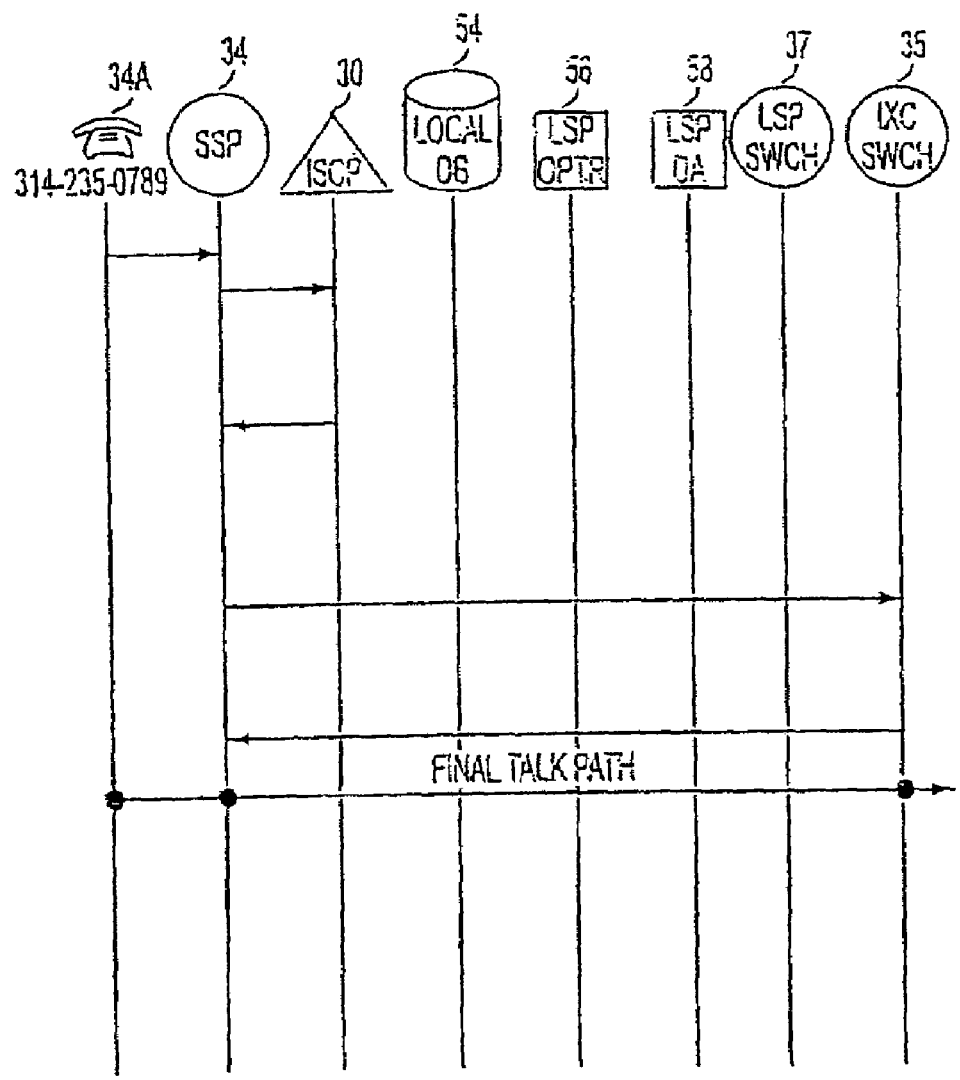
FIG. 7 is a message flow diagram showing the message flow between various components of the AIN network for situations when a 0+ call is made to an inter-LATA destination having LSP facilities available, according to an aspect of the present invention.

FIG. 7 shows the call flow of a 0+ call to an inter-LATA destination. The calling party 314-235-0789 dials 0+816-342-1111. The SSP 34 collects the originating number and dialed number, determines the nature of number and passes the information on to the ISCP 30. The ISCP 30 determines that the traffic type is operator traffic and that the call is inter-LATA. Therefore, LRS is inapplicable. The ISCP 30 generates billing information and tells the SSP 34 to contact the inter-exchange carrier switch 35 which establishes a connection with the destination number to result in the final talk path as shown in FIG. 7.

Figure 8:
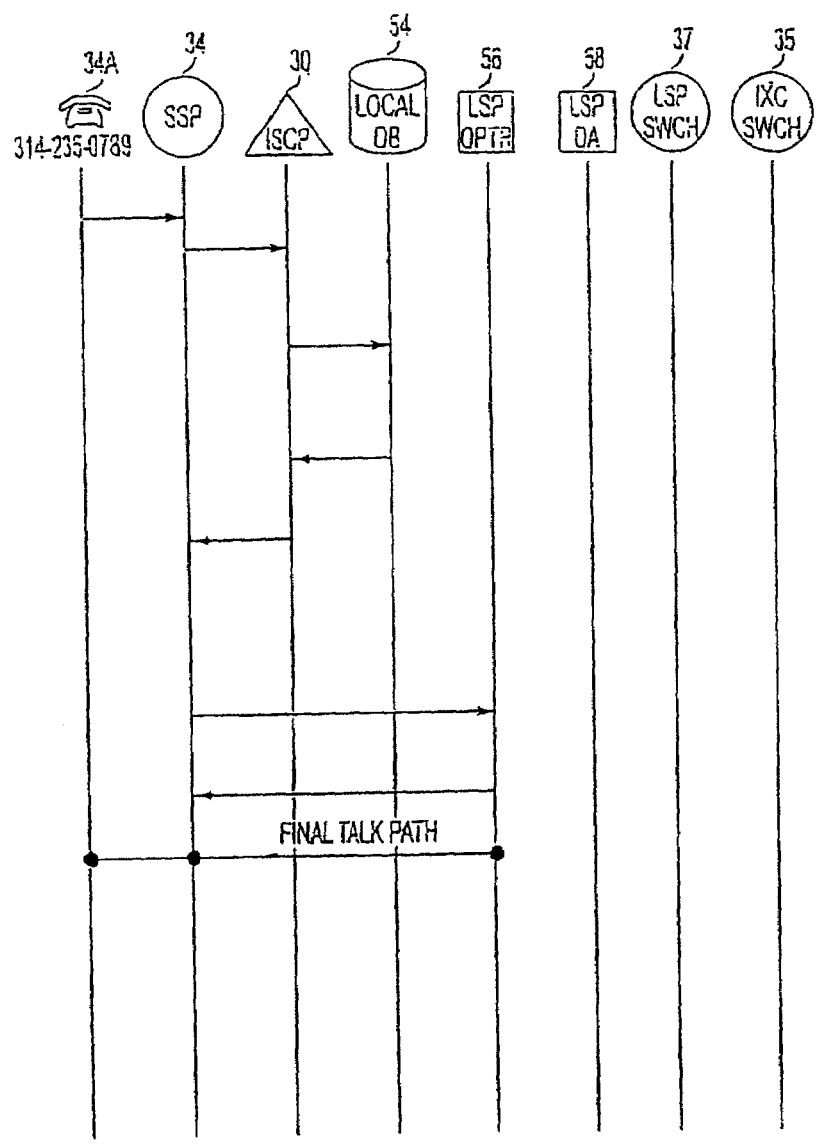
FIG. 8 is a message flow diagram showing the message flow between various components of the AIN network for situations when a 0+ call is made to a local destination having LSP facilities available, according to an aspect of the present invention.

FIG. 8 shows the call flow of a 0+ call to a local destination with LSP facilities for handling operator calls. The same calling number as shown in FIG. 7 calls 0+314-521-1365. The SSP 34 collects information similar to the information collected in FIG. 7, and forwards the information to the ISCP 30 which determines that the call is an intra-LATA call due to the identical NPAs. The ISCP 30 then sends the dialing plan number of the calling party, the calling party ID, and NPANXX of the called party to the LDB 54 which determines whether or not the call is local. In the example shown in FIG. 8, the call is determined to be local causing the ISCP 30 to forward a routing index to the SSP 34 along with the billing information. The SSP 34 then routes the call to the LSP operator system 56 via a MOSS connection establishing the final talk path from the calling party to the LSP operator system 56. The LSP operator then handles the operator call.

Figure 9:
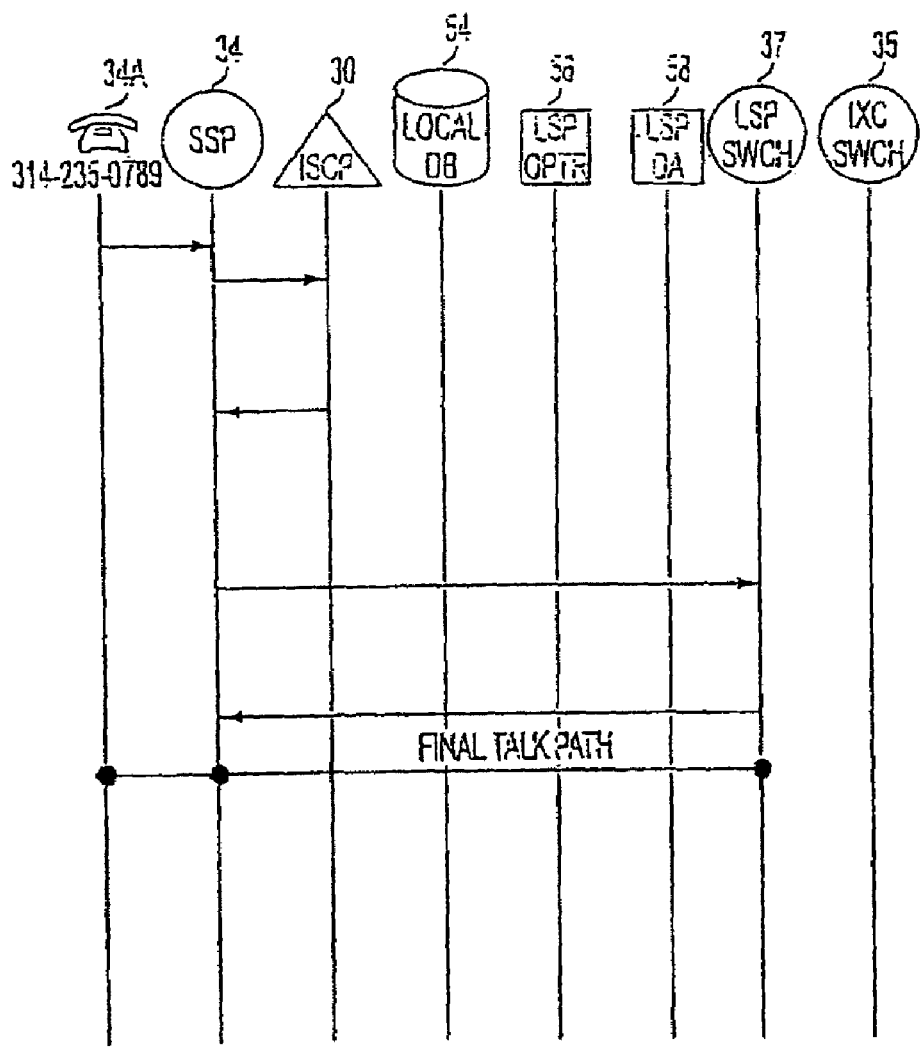
FIG. 9 is a message flow diagram showing the message flow between various components of the AIN network for situations when a seven digit local call is made to a local destination having LSP facilities available, according to an aspect of the present invention.

In FIG. 9 calling party 314-235-0789 dials the telephone number 636-0952. The SSP 34 forwards the calling party's number, the called party number, and the NON to the ISCP 30 which determines that the call is a local call due to the seven digit called number. The ISCP 30 then forwards the routing index for local calls (because the LSP has its own local facilities) to the SSP 34 along with other AMA billing information. The SSP 34 then routes the call to the LSP switch 37 which connects the call establishing a final talk path between the calling party 34A and the LSP switch 37.

In order to implement LRS within the ISCP 30, two levels must be established. The first level is the LSP level and the second dependent level is the line level. The LSP level is a table of data utilized by the line level. The purpose of the LSP level is to consolidate all SSP routing indexes for operator, directory assistance, and local trunk groups that support LRS into one location to simplify provisioning and ease maintenance. Due to consolidation, an existing routing index can be changed without disrupting the service. Consolidation also allows a routing index to be either added or removed from all lines of an SSP at the line level in one non-disruptive step. The LSP level is implemented with the LSP table described above. Preferably the table's name includes the LSP's AECN. Each LSP's LRS routing table may be utilized for both LRU and LRR. Each LSP's LRS routing table may include entries for all SSPs served by the ISCP in which the LSP's LRS routing table is installed. Conversely, any entry that an LSP has for all SSPs served by the ISCP 30 must be in the same LRS routing table.

Figure 10:
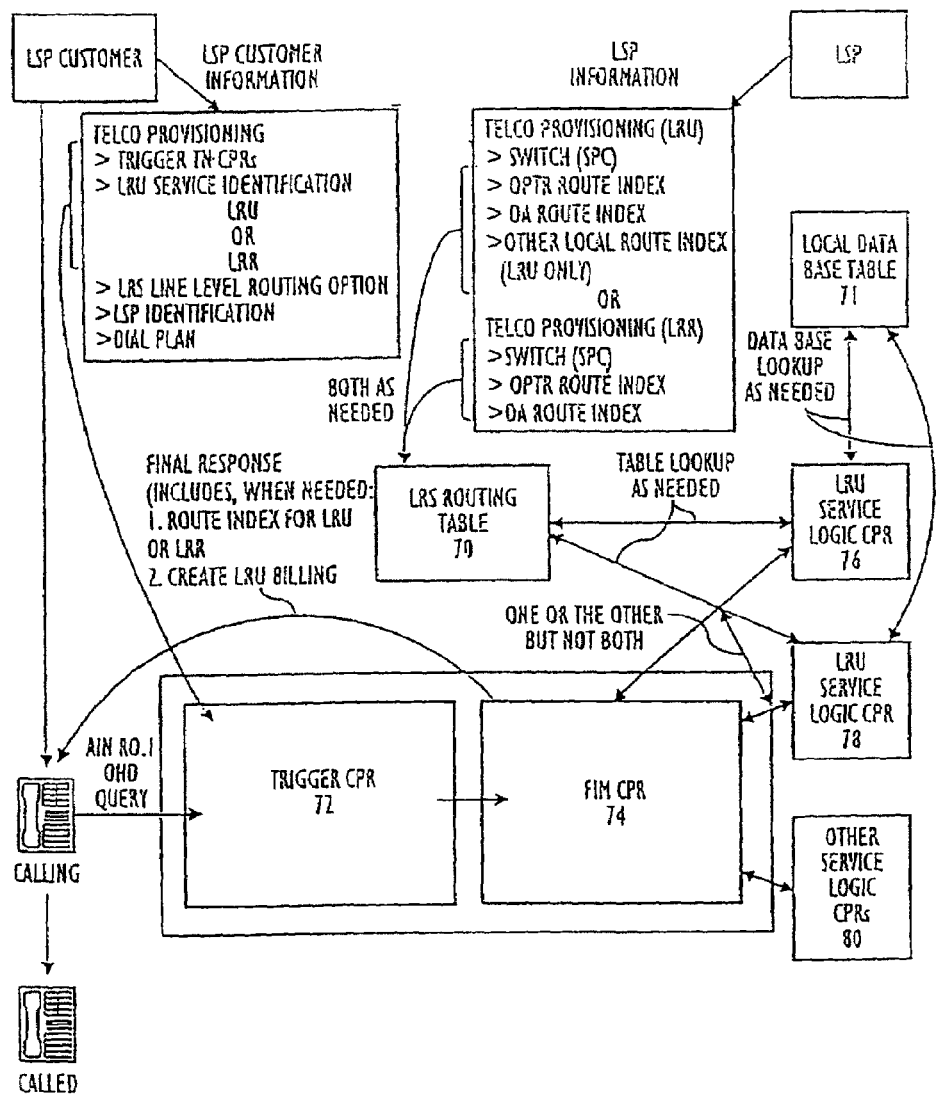
FIG. 10 is a block diagram illustrating the relationship between the components of the system of the present invention for an originating call, according to an aspect of the present invention.

Referring now to FIG. 10, an exemplary ISCP logic architecture for LRU and LRR originating calls is described. Once an LSP has its LSP level information setup for the area served by an ISCP 30, it is possible for the LSP to place orders for ULS ports or resold lines for the same area. Lines require trigger CPRs 72 with some line specific variables. The trigger CPRs 72 connect to a feature interaction manager (FIM) CPR 74 which connects to LRS service logic CPRs 76, 78 and other service logic CPRs 80. The trigger CPR 72 may consist of either trigger specific modules or one default trigger module. In either case, only one logic block exists within the trigger CPR 72 for a telephone number and that logic block must contain all modules. Both LRS CPRs 76, 78 communicate with the LRS routing table 70 which receives information from the LSP as discussed above, and the local database table 54 for determining whether a call is local as discussed above.

Although FIG. 10 shows an OHD trigger, for centrex the OHD trigger should be replaced with a CDP-AC or CDP-IC trigger. For 5ESS PRI, the OHD trigger should be replaced with a PRI B-CH trigger. Although FIG. 10 shows the LRU and LRR service logic as being separate, it is also possible to create a completely integrated logic, such as a combined CPR for the operator and directory assistance components of LRS and a separate CPR for the other traffic component of LRU. Alternatively, it is possible to separate or integrate the TAT and 10D logic modules for LRU terminating traffic (FIG. 11) with other LRS service logic modules.

Figure 11:
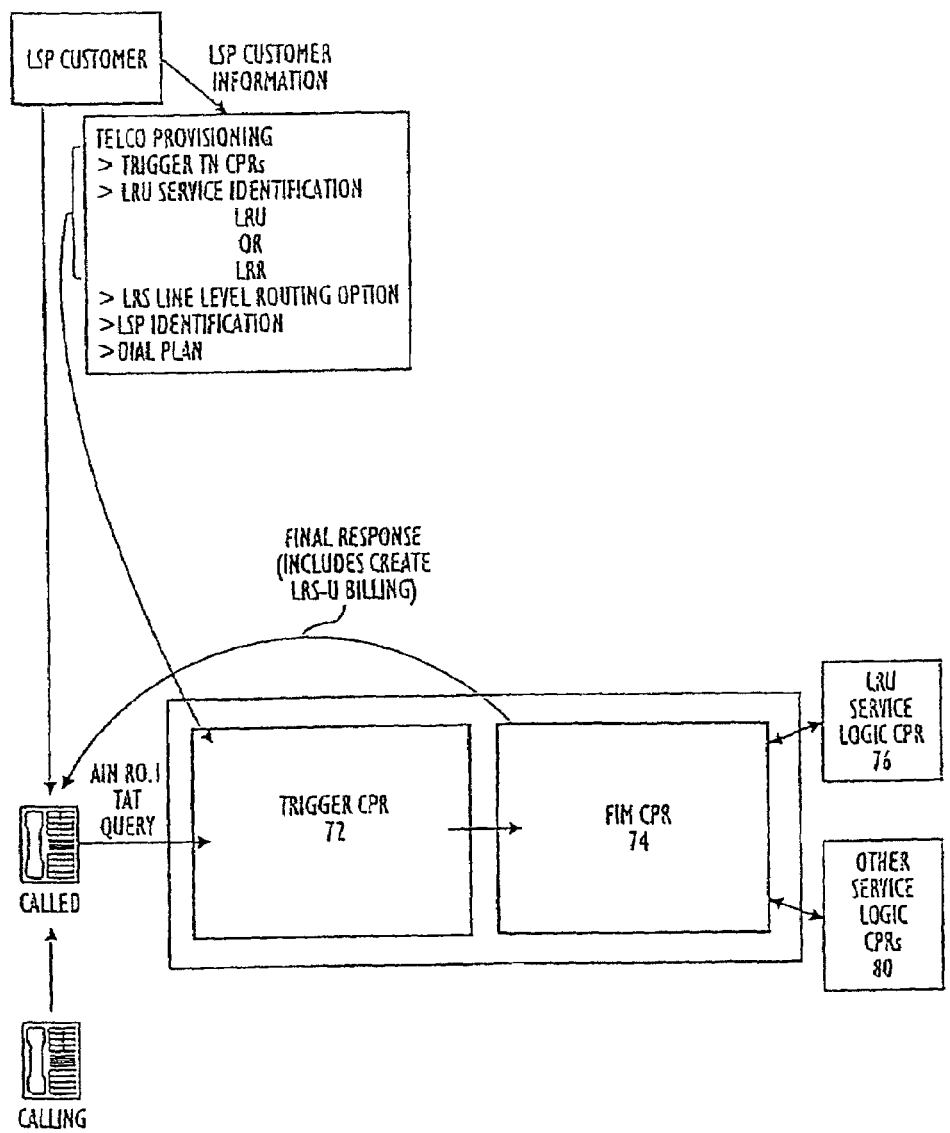
FIG. 11 is a block diagram illustrating the relationship between the components of the system of the present invention for a terminating call, according to an aspect of the present invention.

FIG. 11 shows an ISCP logic architecture for LRU terminating calls. The architecture is similar to the architecture shown in FIG. 10 but it is simpler, only requiring the trigger CPR 72, FIM CPR 74, LRU CPR 76 and other service logic CPRs 80.

For POTS, LRS utilizes both originating and terminating triggers on the SSP. LRS requires the triggers to be applied on a per telephone number basis. The OHD trigger is utilized on all switch ports which are being sold on an unbundled basis to LSPs to provide routing service, if desired by the LSP, and to always create originating AMA records unless the 5ESS PRI switch is being utilized. For the 5ESS PRI switch, LRU utilizes a PRI B channel (PRIBC) trigger on all PRI switch ports which are being sold on an unbundled basis to LSPs to provide routing service, if desired by the LSP, and to always create originating AMA records. LRU utilizes TAT or 10D triggers on all switch ports which are being sold on an unbundled basis to LSPs to always create terminating AMA records. LRR utilizes an OHD trigger on all switch ports which are being resold on other than an unbundled basis to LSPs to provide routing service, if desired by the LSP. But for 5ESS PRI, LRR will utilize a PRIBC trigger on all PRI switch ports which are being sold on other than an unbundled basis to LSPs to provide routing service, if desired by the LSP. As a consequence of the trigger requirements, LRU's OHD-PRIBC and TAT/10d triggers always exist on all POTS switch ports which are being sold on an unbundled basis to LSPs because of billing. If a particular LCC is for terminating only, the OHD/PRIBC trigger still exists in the ISCP, however, the trigger will not be utilized because no OHD/PRIBC trigger is in the SSP.

The LRR OHD/PRIBC trigger only exists if the LSP has active routing service. If an LSP retailing lines bought wholesale from the incumbent LEC later decides to have active routing service, the ISCP would need, after establishing their LRS routing table, to have CPRs for each line added, and the SSPs would need to have a trigger set.

For centrex, LRS also utilizes both originating and terminating triggers on the SSP applied on a per telephone number basis. The following triggers are utilized on all switch ports which are being sold on an unbundled basis to LSPs to provide routing service, if desired by the LSP, and to always create AMA records for 9+ calls that escape outside the centrex: CDP-AC on the AXE-10, DMS-100 and 5ESS; and OHD on the 1AESS. LRU utilizes the following triggers to create originating AMA records for 2-6 digit station to station (intra-centrex) calls: CDP-AC on the 5ESS; and CDP-IC on the AXE-10, DMS-100, and 1AESS. LRU always utilizes a TAT trigger on all switch ports being sold on an unbundled basis to LSPs to always create terminating AMA records.

As a result of the centrex trigger requirements, LRU originating triggers exist for all standard LRS centrex calls on all centrex switch ports which are being sold on an unbundled basis to LSPs. Moreover, LRU TAT triggers always exist on all centrex switch ports which are being sold on an unbundled basis to LSPs. LRRs originating trigger for 9+escape to the outside calls will only exist if the LSP has active routing service. If an LSP retailing lines bought wholesale from the incumbent LEC later decide to have active routing service, the ISCP needs, after establishing the LRS routing table, to have CPRs for each line added and the SSP would need to have a trigger set.

LRU also requires an LRS_DMSDID provisionable call variable with a yes/no data type. Alternatively, a provisionable variable common to multiple services, performing the same function, and kept in a data block added to the trigger CPR when the first service of that group of multiple services is provisioned, may be utilized. When the LRU telephone number is part of a DMS-100 DID trunk group, LRS_DMS-DID, or an alternative common variable, will be set to YES.

When the service is LRR or an LRU for a telephone number that is not part of a DMS-100 DID trunk group, the LRS_DMSDID, or an alternative common variable, will be set to NO which is the default.

LRU also requires an LRS_DMSDID digit provisionable variable. Alternatively, a provisionable variable, in a multiple service, performing the same function, and kept in a data block added to the trigger CPR 72 when the first service of that group or multiple services is provisioned, may be utilized. When the LRS_DMSDID is set to YES, the value of LRS_DMSDID digit, or the alternative common variable, will be set to 7 or 10 as required for that DMS-100 DID trunk group. When LRS_DMSDID is set to NO, the value of LRS_DMSDID digit, or the alternative common variable, will be set to 7, which is the default.

Another variable that may be utilized is the LRS_DMSDID trunk provisionable variable. Alternatively, a provisionable variable, in a multiple service, performing the same function, and kept in a data block added to the trigger CPR when the first service of that group of multiple services is provisioned, may be utilized. When LRS_DMSDID is set to YES, the value of LRS_DMSDID trunk, or the alternative common variable, will be set to the routing index for that DMS-100 DID trunk group. When LRS_DMSDID is set to NO, the value of LRS_DMSDID trunk or the alternative common variable, will be set to zero, the default value.

These provisionable variables must be part of the trigger CPR 72 for a telephone number with either LRU or LRR. All of the provisionable variables should become a part of a data block. In a preferred embodiment, ISCP version 5.0 should be utilized. However, if a lower version such as ISCP version 4.3 is utilized, it is acceptable for the calling scope and LSP provider variables to be part of either the logic block or a common data block.

In order to facilitate LRS interaction with other AIN services, a variable may be provided which passes from the trigger CPR 72 to the feature interaction manager CPR 74 indicating whether or not the LDB 54 was utilized. If a LDB lookup was performed, the variable passes the result so that the feature interaction manager CPR 74 can forward that information on to other services, and potentially prevent superfluous LDB lookups.

The logic common to LRU and LRR is now described. The logic for operator and directory assistance traffic (the traffic the two services have in common) depends on a trigger such as an OHD, PRIBC or CDP-AC trigger. Initially, the LRS logic identifies 911 traffic based upon the digits 911 input by the calling party. Although SSPs should have an OHD exclusion list which includes 911, 911 traffic is identified in the LRS logic as a backup. For the CDP-AC triggered traffic, an equivalent 911 exclusion list is within the ISCP to identify 911, and is therefore not merely a backup. The LRS logic also identifies 10XXX traffic and routes it to an IXC switch because the calling party has made a deliberate decision to utilize the dialed carrier.

The LRR logic then identifies seven digit local traffic based on the number of digits dialed by the calling party. The digits are returned to the SSP as correctly dialed local traffic, and are never associated with operator and directory assistance traffic. The LRS logic also identifies international traffic, both direct dialed and operator dialed, and returns it as correctly dialed international traffic to the SSP. The LRS logic identifies 0+NPA-555-1212 dialed traffic based on the NXX-XXXX being equal to 555-1212, and returns it as correctly dialed traffic to the SSP. The LRS logic determines if the 555-1212 traffic is local by looking in the table within the ISCP which has a LATA for each calling party and for each area code plus 555 per state.

The logic then determines whether all intra-LATA operator and directory assistance calls should be routed to the LSP. If the determination is yes, first it is determined whether the NPA dialed is the same as the calling number. If the NPAs are identical, the traffic is routed to the LSP. Otherwise, a lookup in the LATA table is made to see if the called number is in the same LATA as the calling number. If the called number and calling number are within the same LATA, the traffic is routed to the LSP. Otherwise, the traffic is routed normally, to an IXC.

The LRS logic also identifies 1+800-NXX-XXXX intra-LATA and inter-LATA traffic, both direct dialed and operator, based on the NPA being equal to 800, 888, etc., and returns the called number to the SSP as correctly dialed traffic. Although the preceding and following description describes the LRS logic as returning information directly to the SSP, in fact, according to a preferred embodiment, the LRS logic first returns control of the call to the FIM CPR 74, and the FIM CPR eventually returns the response to the SSP.

The LRS logic identifies ten digit inter-LATA traffic, both direct dialed and operator, based on the LATAs of the calling party and the called party not being equal. A lookup is done in the ISCP's LATA table to determine the LATA of both the calling party and the called party. If the LATAs are not equal, the traffic is determined as being inter-LATA, in which case it is returned as dialed to the SSP and validated as correctly dialed inter-LATA traffic.

The LRS logic also identifies ten digit intra-LATA operator dialed traffic based on the LATAs of the calling party and called party being equal per the ISCPs NPANXX table (local database) 54. The LRS logic sends the called number to the LDB 54 for a local versus toll determination based on the calling scope of the NPANXX of the called number. If the called number is identified as local by the LDB lookup, the LRS logic will then check for a routing index in the LRS routing table 70 based on the value of the LSP provider variable. If the routing index is found to exist and is not equal to the default routing index, the LRS logic returns the called number and routing index to the SSP. If no routing index is found in the table 70, or the routing index is equal to the default value, the ISCP tells the SSP to route to the dialed number. If the called number is identified as a toll number by the LDB 54, the LRS logic returns the called number to the SSP.

The LRS logic also identifies 411 and operator dialed 411 (0+411) traffic based on the NPA of the called number being equal to 411, and for operator dialed 411 the NON being equal to operator. Once identified as direct dialed 411 or operator dialed 411, the LRS logic-checks for a routing index in the LRS table 70 based on the value of the LSP provider variable. If a routing index is found to exist and is not equal to the default, the LRS logic returns the routing index value from the LRS routing table 70 to the feature interaction manager CPR 74. If the LRS routing table 70 is checked and no routing index is found or the routing index is equal to the default, the ISCP tells the SSP to route to the dialed number.

The LRS logic identifies operator dialed 311 (0+311) traffic based on the NPA of the dialed number being equal to 311 and the NON being equal to operator. Once identified as operator dialed 311, the LRS logic checks for the routing index in the LRS routing table 70 based on the value of the LSP provider and if the routing index is found to exist and is not equal to the default, the LRS logic returns the called number and routing index from the LRS table 70 to the FIM CPR 74. When the default routing index or no value is found in the LRS routing table 70, the ISCP tells the SSP to route to the dialed number.

The LRS logic also identifies 00 dialed traffic based on the absence of a value for the dialed number or the digits or value of 0 for the dialed number. The DMS-100. shows one 0 in the dialed number when 00 is called. The other SSPs show no value for the dialed number. Once identified as a 00 call, the ISCP tells the SSP to route to the dialed number.

The LRS logic identifies 0 dialed traffic based on the absence of a value for the called number. Once identified as 0, the LRS logic checks for a routing index in the LRS routing table 70 based on the value of the LSP provider. If the routing index is found to exist and is not equal to the default, the LRS logic returns the following information to the FIM CPR 74: the called number, and the routing index value found in the LRS routing table 70. The lookup in the LRS routing table 70 is dependent upon whether or not the end office is an AXE-10. If the end office is an AXE-10, the LRS routing table lookup may be based on the OPM value. If the end office is anything other than an AXE-10, the lookup can only be for the operator value. If there is no value or the value is the default value in the LRS routing table 70, the ISCP tells the SSP to route to the dialed number.

Now the logic unique to LRU is discussed. Once the logic common to LRU and LRR has been traversed, the only originating traffic left is 311, seven digit local, and ten digit intra-LATA direct dialed traffic. The LSP may choose to have a trunk group from the originating SSP routed to a switch of their own for 311, seven digit local, and the local portion of the ten digit intra-LATA direct dialed traffic.

The LRU logic identifies seven digit 555-XXXX, 950-XXXX and 976-XXXX traffic based on the number of dialed digits being seven and the NXX being 555, 950 or 976, respectively. Once identified, the LRU logic returns the called number to the FIM CPR 74 to cause the traffic to utilize the incumbent LECs network. The LRU logic identifies seven digit local traffic based on the number of digits in the called number being seven. Once it is identified as local, the LRU logic then checks for a routing index for local traffic in the LRU routing table 70 based on the value of the LSP variable, and if the routing index is found to exist and is not equal to the default value, the LRU logic returns the called number to the FIM CPR 74 along with the value retrieved from the LRS routing table. If the routing index is equal to the default value or does not exist, the ISCP tells the SSP to route to the dialed number.

The LRU logic also identifies ten digit intra-LATA direct dialed traffic based on the LATAs of the called number and the calling party being equal per the ISCP's LDB table 54. The LRU logic then forwards the called number to the LDB 54 for a local versus toll determination based on the calling scope of the NPANXX of the called number. If the called number is identified as local by the LDB lookup, the LRU logic then checks for the routing index for local traffic in the LRS routing table 70 based on the LSP variable for that calling party. If the routing index is found to exist, and is not equal to the default, the called number along with the value obtained in the LRS routing table for local traffic is forwarded to the FIM CPR 74. If there is no value in the LRS routing table 70 or the value is equal to the default, then the ISCP tells the SSP to route to the dialed number. If the called number is identified as a toll number by the LDB lookup, the ISCP tells the SSP to route to the dialed number.

The LRU logic also identifies 311 direct dialed traffic with or without a 1 prefix (because both are treated the same) based on the NPA of the called number being equal to 311. Once identified as 311 direct dialed, the LRU logic then checks for a routing index for local traffic in the LRS routing table 70 based on the LSP assigned to that calling party. If the routing index is found to exist and is not equal to the default value, the LRU logic returns the called number and the value from the LRS routing table for local traffic to the FIM CPR 74. If no value is found in the LRS routing table 70 or the default value is found, the LRS logic returns the called number along with the default routing index to the FIM CPR 74.

For 1AESS switches, 1+411 calls are not accepted/routed properly with LRU. Thus, in order to keep the directory assistance traffic on the incumbent LEC's network, a route index pointing to the LEC's directory assistance trunk group is returned.

For terminating calls, the LRU logic has only one objective, cause a billing record to be created at the SSP for all terminating calls. Thus, LRU terminating logic tells the FIM CPR 74 that the call is cleared for completion to the called number. However, other services may divert the calls to a telephone number other than the called number. The LRU logic returns billing information to the FIM CPR 74.

The LRS should also be able to interact with other AIN services. In order for the interaction to occur, the LRS trigger must be integrated with the other services trigger CPR 80. Moreover, the LRS logic is even invoked if a call to a terminating trigger is re-routed by another AIN service. That call may be redirected to a local number which requires LRS routing (and originating billing).

For example, disaster routing service and intelligent redirect may be integrated with LRS. Disaster routing allows a subscriber to predefine three destination telephone numbers for each CDN in a group of CDNs and then have one of those groups in effect. Thus, disaster routing allows the subscriber to reroute all calls to CDNs from one location to another location in the event the first location is lost because of a disaster. Intelligent redirect allows a subscriber to reroute all calls to CDNs at one location to another location based on various criteria such as time of day. For example, all calls could route to a first number from 9:00 am to 5:00 pm, and to another number at all other times. Because the disaster routing service and intelligent redirect (DIF) are only initiated via terminating triggers, LRR is inapplicable. However, LRU which does utilize terminating triggers for billing must be integrated.

The integration is via the feature interaction manager CPR 74. The FIM CPR 74 should receive variables back from DRF indicating whether or not a DRF billing record is to be generated, and the telephone number to which the call is to be routed. The information will then be utilized by LRU in order to route the number to the proper destination, and to generate a single billing record reflecting the LRU and DRF usage. The feature interaction manager may integrate features other than LRS with LRS by executing the other features first, and based upon the results reported to the feature interaction manager from the other features, executing the LRS logic.

Another exemplary feature which may interact with LRS is positive ID described in U.S. patent application Ser. No. 09/050,986 to K. Krein et al., filed on Mar. 31, 1998, entitled "Profile Management System Including User Interface for Accessing and Maintaining Profile Data of User Subscribed Telephony Services", which is herein expressly incorporated by reference in its entirety. Positive ID determines whether a calling party will be blocked from reaching the destination number and accordingly has terminating call triggers. Positive ID does not require any billing and does not interact with LRU on that basis. However, positive ID can modify the LRU call processing record by blocking completion to the called number. Exemplary variables received by the feature interaction manager CPR 74 include a variable indicating whether or not the connection is authorized or whether a blocking announcement is to be played. In response to the variables received from positive ID, LRU directly interacts with positive ID on the terminating triggers and acts in accordance with the values in the variables.

While the invention has been described with reference to several exemplary embodiments, it is understood that the words which have been utilized are words of description and illustration, rather than words of limitation. Changes may be made, within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses, such as are within the scope of the appended claims.

What is claimed is:

1. A communication network element for routing communications from an originating connection address to a destination connection address over a network, the communication network element comprising:
    a receiver configured to receive a signal, comprising the originating connection address and the destination connection address;
    a processor configured to determine a service provider associated with at least one of the originating connection address and the destination connection address of the received signal, and to determine a routing preference associated with the service provider using routing data, and
    a service creator configured to interact with a service management system to create and/or modify a routing service application.

2. The communication network element of claim 1, wherein the processor provides instructions for routing the communications based on the determined routing preferences.

3. The communication network element of claim 1, wherein the service creator loads the routing service application into a storage.

4. The communication network element of claim 1, further comprising:
    a memory configured to store information used by the communication network element to determine whether the service provider has a routing preference.

5. The communication network element of claim 4, further comprising:
    a memory configured to store information that associates the service provider with routing preference information.

6. The communication network element of claim 1, wherein the routing data further includes a variable that indicates an identity of the service provider.

7. The communication network element of claim 6, wherein the variable is used to determine whether a local routing service routing table is to be searched for a local routing index, comprising local destination connection addresses.

8. The communication network element of claim 7, wherein the local routing service routing table includes a local routing index comprising local destination connection addresses.

9. A computer readable medium for storing a computer program, recorded on the computer readable medium and being executed by a computer processor, that enables communications to be routed from an originating connection address to a destination connection address over a network, the computer readable medium comprising:
    a receiving code segment, recorded on the computer readable medium, that receives a signal, comprising the originating connection address and the destination connection address;
    a determining code segment, recorded on the computer readable medium, the determines a service provider associated with at least one of the originating connection address and the destination connection address,
    a routing preference code segment, recorded on the computer readable medium, that determines a routing preference associated with the service provider based on routing data, and
    a service creator code element, recorded on the computer readable medium, that interacts with a service management system to create and/or modify a routing service application.

10. The computer readable medium of claim 9, further comprising:
    a storing code segment, recorded on the computer readable medium, that stores information that associates the service provider with routing preference information.

11. The computer readable medium of claim 10, wherein the routing data further includes a variable that indicates an identity of the service provider.

12. The computer readable medium of claim 11, wherein the variable is used to determine whether a local routing service routing table is to be searched for a local routing index, comprising local destination connection addresses.

13. The computer readable medium of claim 12, wherein the routing service routing table includes a local routing index comprising local destination connection addresses.

14. The computer readable medium of claim 9, further comprising:
    a routing code segment, recorded on the computer readable medium, that provides instructions for routing the communications in accordance with the routing preference.

15. A method of routing communications from an originating connection address to a destination connection address, the method comprising:
    receiving a signal, comprising the originating connection address and the destination connection address;
    determining a service provider associated with at least one of the originating connection address and the destination connection address;
    determining a routing preference associated with the service provider using routing data;
    providing instructions to route the communications in accordance with the determined routing preferences, and
    performing at least one of creating and modifying a routing service application via an interface of a service management system implemented on at least one computer processor.

16. The method of claim 15, further comprising:
    storing information that associates the service provider with routing preference information.

17. The method of claim 16, wherein the routing data further includes a variable that indicates an identity of the service provider.

18. The method of claim 17, further comprising:
searching a service provider table to determine the routing preference specified by the service provider.

19. The method of claim 18, wherein the service provider table includes a unique routing index for specified combinations of geographic areas associated with at least one originating connection address and destination connection address.

20. The method of claim 15, further comprising:
managing records for routed communications.

* * * * *